(12) United States Patent
Kazerooni et al.

(10) Patent No.: US 6,554,337 B2
(45) Date of Patent: Apr. 29, 2003

(54) MECHANICAL GRAPPLE FOR GRABBING AND HOLDING SACKS AND BAGS

(75) Inventors: Homayoon Kazerooni, 2806 Ashby Ave., Berkeley, CA (US) 94705; Christopher Jude Foley, Albany, CA (US)

(73) Assignee: Homayoon Kazerooni, Berkeley, CA (US)

( * ) Notice: Subject to any disclaimer, the term of this patent is extended or adjusted under 35 U.S.C. 154(b) by 66 days.

(21) Appl. No.: 09/755,496

(22) Filed: Jan. 5, 2001

(65) Prior Publication Data

US 2002/0125727 A1 Sep. 12, 2002

Related U.S. Application Data

(60) Provisional application No. 60/251,931, filed on Dec. 7, 2000.

(51) Int. Cl.[7] .................................................. B25J 15/00
(52) U.S. Cl. ......................... 294/86.4; 294/1.1; 271/21
(58) Field of Search ................................. 294/1.1, 86.4, 294/102.1, 102.2, 103.1, 114; 271/19, 21–23, 109; 414/618, 626

(56) References Cited

U.S. PATENT DOCUMENTS

| 3,197,250 A | * | 7/1965 | Trotta et al. ............. 294/102.1 |
| 3,239,263 A | * | 3/1966 | Farmer et al. ............... 294/114 |
| 3,653,708 A | * | 4/1972 | Merola .................... 294/102.1 |
| 4,181,345 A | | 1/1980 | Achelpohl |
| 4,226,458 A | | 10/1980 | Achelpohl et al. |
| 4,549,760 A | | 10/1985 | Minenko et al. |
| 4,578,013 A | * | 3/1986 | Barillec et al. ................ 271/21 |
| 4,852,927 A | | 8/1989 | Minenko et al. |
| 5,303,910 A | * | 4/1994 | McGill et al. ........... 271/10.01 |

FOREIGN PATENT DOCUMENTS

| DE | 2749-908 | * | 5/1979 | ................... 271/21 |
| JP | 1-231732 | * | 9/1989 | ................... 271/19 |
| SU | 1611-822 | * | 12/1990 | ................... 271/21 |

* cited by examiner

Primary Examiner—Dean J. Kramer

(57) ABSTRACT

A grapple device for grasping, holding and releasing an object having a deformable cover material such as sacks and bags, has a mounting bracket and two rollers. The rollers are pushed toward each other by the force of at least one spring. When the rollers are powered to spin, the inward spinning of the rollers causes the sack material to be dragged in between the rollers due to friction between the surfaces of the rollers and the sack material. The spring pushes the rollers toward each other with sufficient force to hold the sack material in place between the rollers. The grapple device also includes a holding mechanism to engage at least one of the rollers and prevent rotation of the roller when engaged, so that when sack material is located in the inter-roller region and the holding mechanism is engaged, the contact between the sack material and rollers causes the sack to be held by the grapple device. When the rollers are powered to spin outwardly, the sack material passes out of inter-roller region causing the sack to be released. Using the invention described here, in conjunction with a robot or a material handling device, a sack can be lifted by grasping any point on the sack. The device includes a control system for operating the device in three phases to: grasp, hold and release sacks.

47 Claims, 27 Drawing Sheets

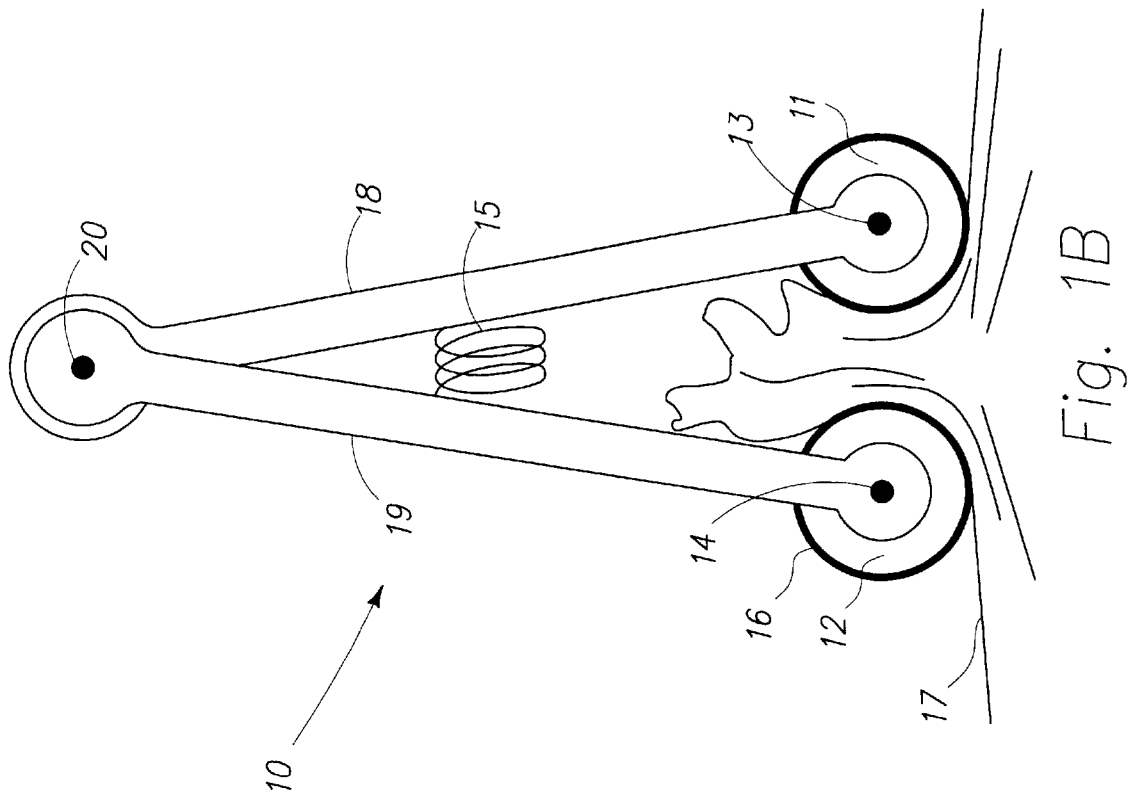
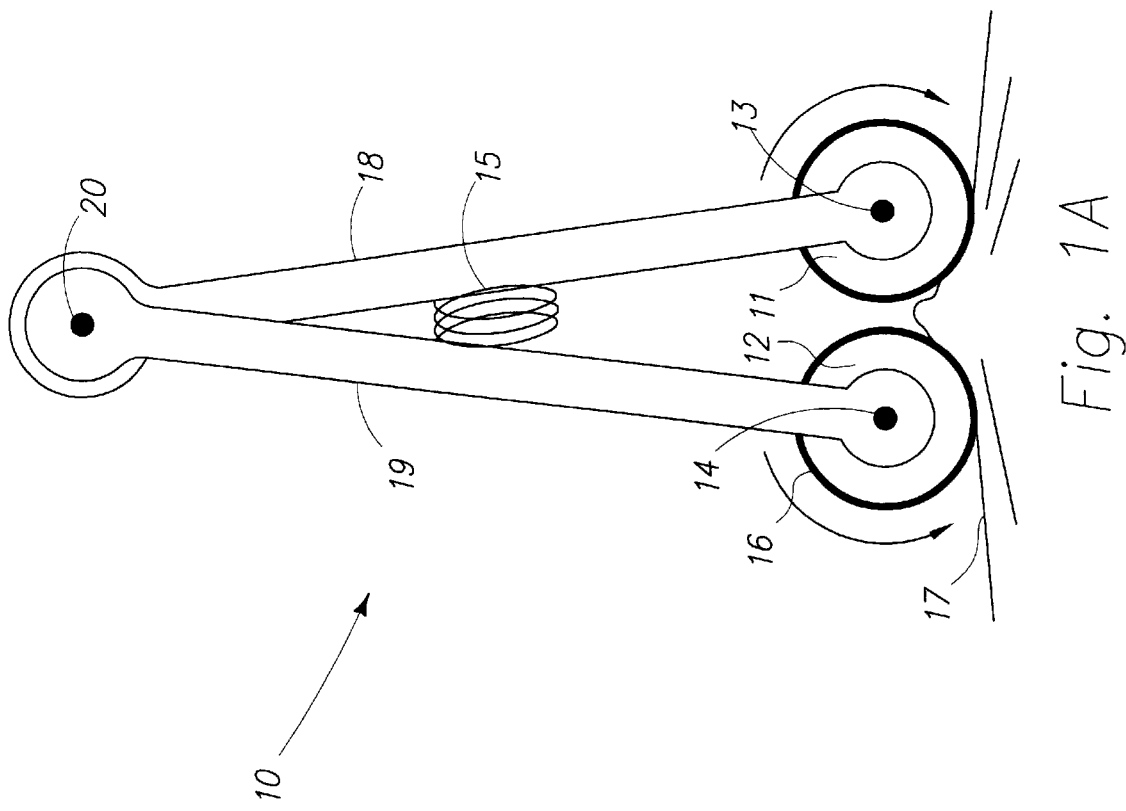

|  | $S_G$ | $S_H$ | $S_R$ | End-Effector States |
|---|---|---|---|---|
| Row 1 | 0 | 0 | 0 | Hold |
| Row 2 | 0 | 0 | 1 | Release |
| Row 3 | 0 | 1 | 0 | Hold |
| Row 4 | 0 | 1 | 1 | Release |
| Row 5 | 1 | 0 | 0 | Grab |
| Row 6 | 1 | 0 | 1 | Release |
| Row 7 | 1 | 1 | 0 | Hold |
| Row 8 | 1 | 1 | 1 | Release |

Fig.5

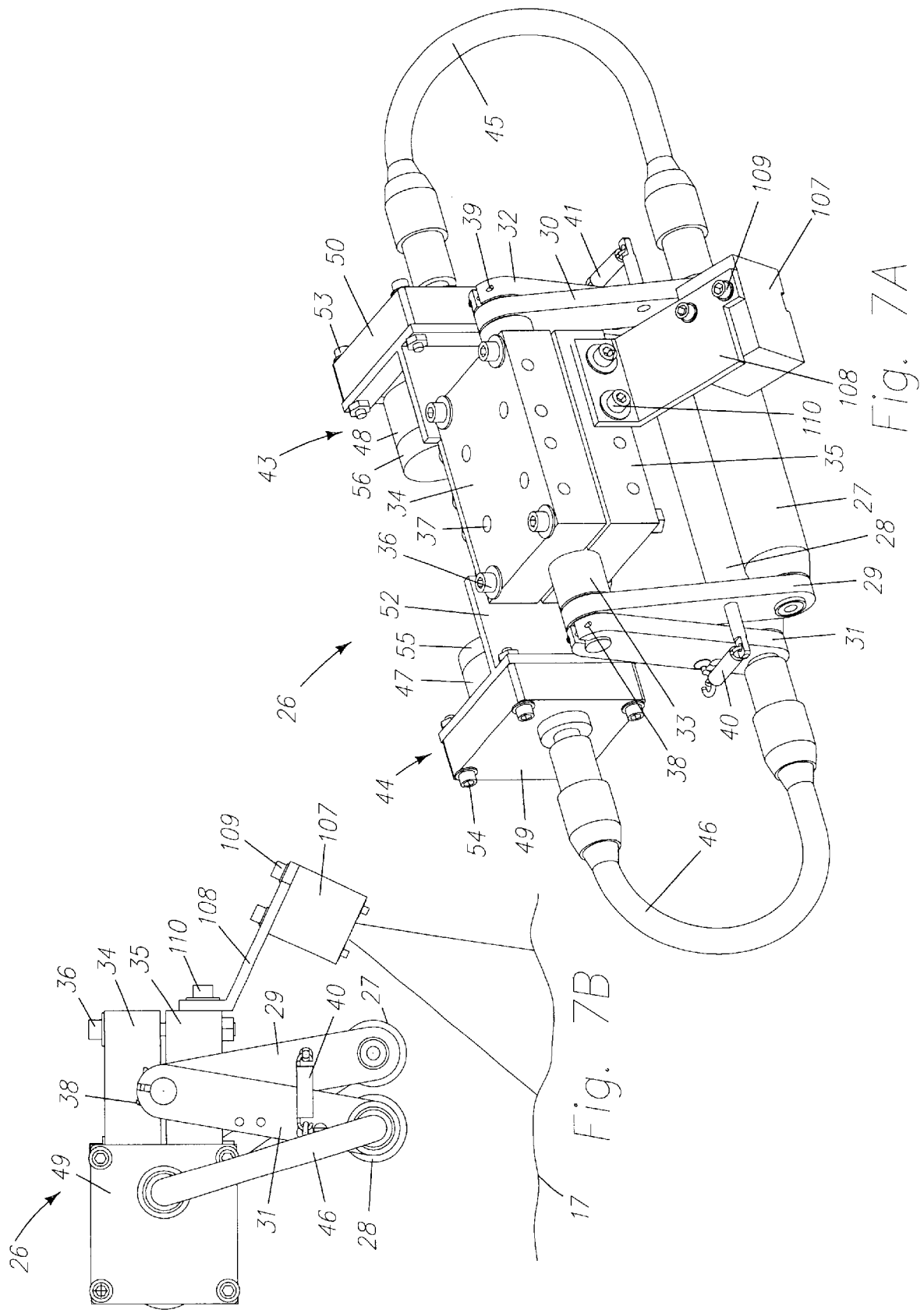

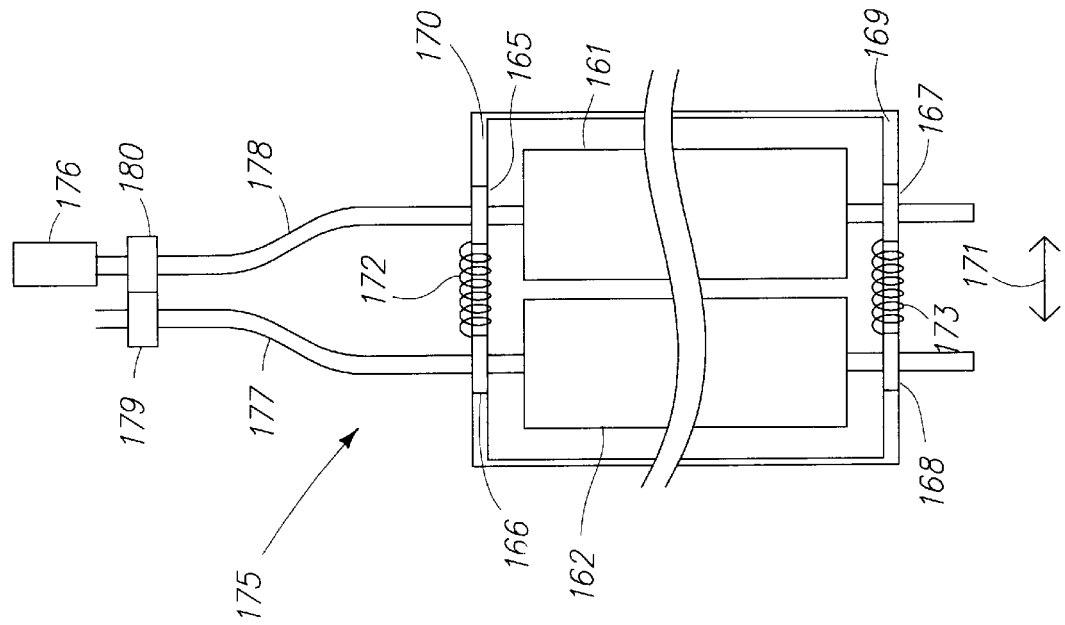
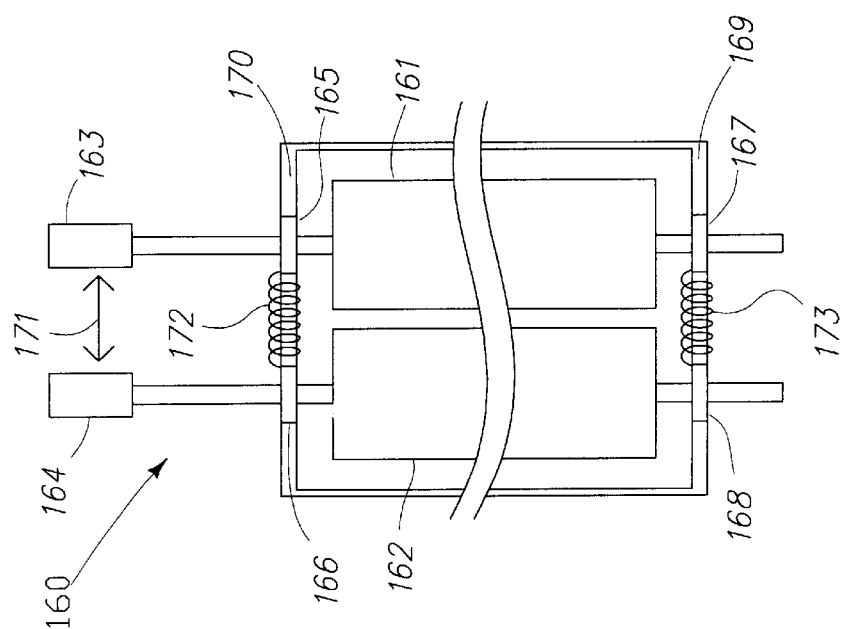

MECHANICAL GRAPPLE FOR GRABBING AND HOLDING SACKS AND BAGS

CROSS REFERENCE TO RELATED APPLICATION

This application is entitled to the benefit of Provisional Patent Application Serial No. 60/251,931 filed on Dec. 7, 2000.

FIELD OF THE INVENTION

This invention relates to material handling devices. More specifically, this invention is a grapple that can be used with robotic or material handling devices for grabbing and holding compliant objects with undefined shapes such as sacks and bags. The grapple of this invention can grab and hold filled sacks from any point on the sack and regardless of the sack orientation and position.

BACKGROUND OF THE INVENTION

Delivery and postal services across the world currently use sacks to hold letters, magazines and small boxes. These sacks are handled manually by mail handlers in the postal service distribution centers. Most sacks used by the US Postal Service (USPS) do not have eyelets, handles or any form of operator interface for lifting and carrying. The shape, size and the weight of a sack depends on the items in the sack and how it is rested on the floor. During several visits of USPS distribution centers, the inventors have observed sacks that were fully filled with magazine bundles and weighed up to seventy pounds. The heavy weight of these sacks, the lack of handles, eyelets or other operator interface on the sacks, and the unpredictable shape and size of the sacks create awkward and uncomfortable handling situations for U.S. mail handlers at all USPS distribution centers. This awkward sack handling, in particular during repeated maneuvers, increases the risk of wrist, finger and back injuries among mail handlers. To minimize the risk of injuries to workers, the inventors carried out an engineering research effort, on a solid scientific foundation, to design a grapple for grasping and holding sacks. The grapple of this invention grabs and holds a sack regardless of the shape and size of the sack from any point on the sack (i.e. it is not necessary to gather and flatten the edge of the sack or orient the sack prior to grasp.) This invention has been tested and proven to be effective in grabbing and holding sacks.

Inventors have created several devices to hold sacks and bags. For example, Achelpohl, U.S. Pat. No. 4,181,345, describes a manually operated clamping device for lifting filled sacks. The device includes a frame supporting a clamping mechanism. The clamping mechanism includes two spaced parallel bars, mounted at their end to two parallel plates and disposed to be rotated in unison about a common parallel axis by a hand-crank. One of the bars is individually rotatable about its own axis and displaceable towards and away from the other bar. To use the device of Achelpohl U.S. Pat. No. 4,181,345, the gathered top of a filled sack is manually placed between the two bars. The hand crank is manually operated to wrap the top of the sack around the two bars and clamp it between them. Once secured in the clamping mechanism, the combined clamping device and sack may then be lifted by the device's frame. Although useful for its purpose, the Achelpohl U.S. Pat. No. 4,181,345 device has the disadvantage of requiring considerable manual manipulation of both the sack and the device to accomplish its utility.

To try to overcome some of the disadvantages of the Achelpohl U.S. Pat. No. 4,181,345 device, Achelpohl, U.S. Pat. No. 4,226,458, discloses a device similar to the U.S. Pat. No. 4,181,345 device. In the U.S. Pat. No. 4,226,458 device, the clamping bars are mechanically separable and are mounted only at one end to a frame, such that they form parallel cantilever arms. This allows the gathered ends of a sack to be either inserted or slide between the clamping bars. The end of the sack is then engaged by mechanically operating the clamping mechanism. This device improves the manual operation required of the U.S. Pat. No. 4,181,345 device wherein it is necessary to manually introduce the end of the sack between the clamping bars. Although the Achelpohl U.S. Pat. No. 4,226,458 device has advantages over the earlier Achelpohl U.S. Pat. No. 4,181,345 device, it still requires the gathered end of a sack to be manually placed between the clamping bars, or that the sack be placed on its bottom and the top of the sack gathered and flattened and presented in a proper configuration before the U.S. Pat. No. 4,226,458 device can slideably engage the top of the sack and secure it for lifting.

In another example, Minenko et al., U.S. Pat. No. 4,549,760, discloses a device for gripping and hoisting packed sacks that utilizes a similar mechanism to grab sacks as the Achelpohl U.S. Pat. No. 4,226,458 device and has similar advantages and disadvantages. However in this case one of the bars moves relative to the other one with the help of a hydraulic linear actuator. The Minenko et al. device still requires the gathered end of a sack to be manually placed between the clamping bars. In this case, the sack is placed on its bottom next to the unpowered bar. The second bar, powered by an actuator moves around the first bar causing the throat of the sack to be secured in between the bars.

A later Minenko disclosure, U.S. Pat. No. 4,852,927, describes using two clamping bars to grip and hold the neck of a sack for lifting and transport. The Minenko U.S. Pat. No. 4,852,927 device includes a locking mechanism to secure the clamping bars in a closed position while gripping a sack. Although useful for its intended purpose, the U.S. Pat. No. 4,852,927 device requires that the neck of the sack be manually inserted between the clamping bars and that the device then be further manually operated to close and lock the neck of the sack in the device. Additionally, the sack cannot be released from the device without first removing the load from the locking mechanism.

All of the devices described in the above patents have the following common characteristics:

The gathered and flattened edge of the sack must be carefully placed between two adjacent bars by an operator prior to grasping.

One of the bars rotates around the other one or both bars rotate along a common axis. Then the gathered and flattened edge of the sack wraps around the bars. The weight of the sack itself pushes the rods against each other therefore locks the edge of the sack in between the bars.

It is necessary that the sack be placed on its bottom so it can be grasped by the device's bars. If a sack cannot be placed on its bottom in a stable form, then the devices described above cannot be used.

In general, a great deal of operator intervention is required for proper and safe operation of the devices described above. This usually results in slow lifting operation and therefore these devices have not been employed in USPS and many other distribution centers where large flow the sacks need to be lifted repeatedly from a shoot or from a conveyor belt.

SUMMARY OF THE INVENTION

The basic idea in design of the grapple of this invention is to create a device that allows at least two rollers, powered by at least one actuator, to turn in opposite directions along their own axes while they are pushed toward each other by force of at least one spring. The inward spinning of the rollers and the friction between the rollers and the sack material causes the sack material to be dragged in between the rollers. When the rollers are prevented from spinning, the sack material is kept secure in between the rollers due to the force of spring and friction between the rollers and the sack material. When rollers rotate outwardly, the sack material will come out of the rollers and the sack will be released. This application describes the hardware architecture, the control method and the design issues associated with the grapple.

OBJECTS AND ADVANTAGES

In view of the above prior art, the object of the present invention is to design a grapple that can grab any point of a sack without any operator intervention and regardless of how the sack is laid on the floor, on a table, or on a conveyor belt. To achieve this objective, an entirely different and effective concept for grasping sacks was developed and is described here. When any of the grapples described in this invention comes in contact with a sack, the sack material will be grabbed and pulled quickly into the grapple without any intervention from the operator. Unlike the devices of the above prior arts, the grapple described here grabs a sack from any point on the sack.

does not require the edge of the sack to be gathered and flattened prior to grasp.

does not require the sack to be placed on its bottom prior to grasp (i.e. the sack can be laid on the floor or on a conveyor belt from any side.)

does not require operator intervention for grasp.

does not use the weight of the sack to lock and secure the sack in the grapple.

BRIEF DESCRIPTION OF THE DRAWINGS

FIGS. 1A and 1B illustrate the basic underlying principle of operation of the grapple.

FIG. 5 illustrates the operational phases of the grapple as a function of the states of three control signals.

FIGS. 7A and 7B show the first embodiment of the grapple where a proximity switch is installed on the grapple to indicate the nearness of the sack to the grapple.

FIG. 19 shows a grapple where the rollers move relative to each other on a linear path and two actuators power the rollers.

FIG. 20 shows a grapple where the rollers move relative to each other on a linear path and one actuator powers the rollers.

DETAILED DESCRIPTIONS OF DRAWINGS

Figure 2A:
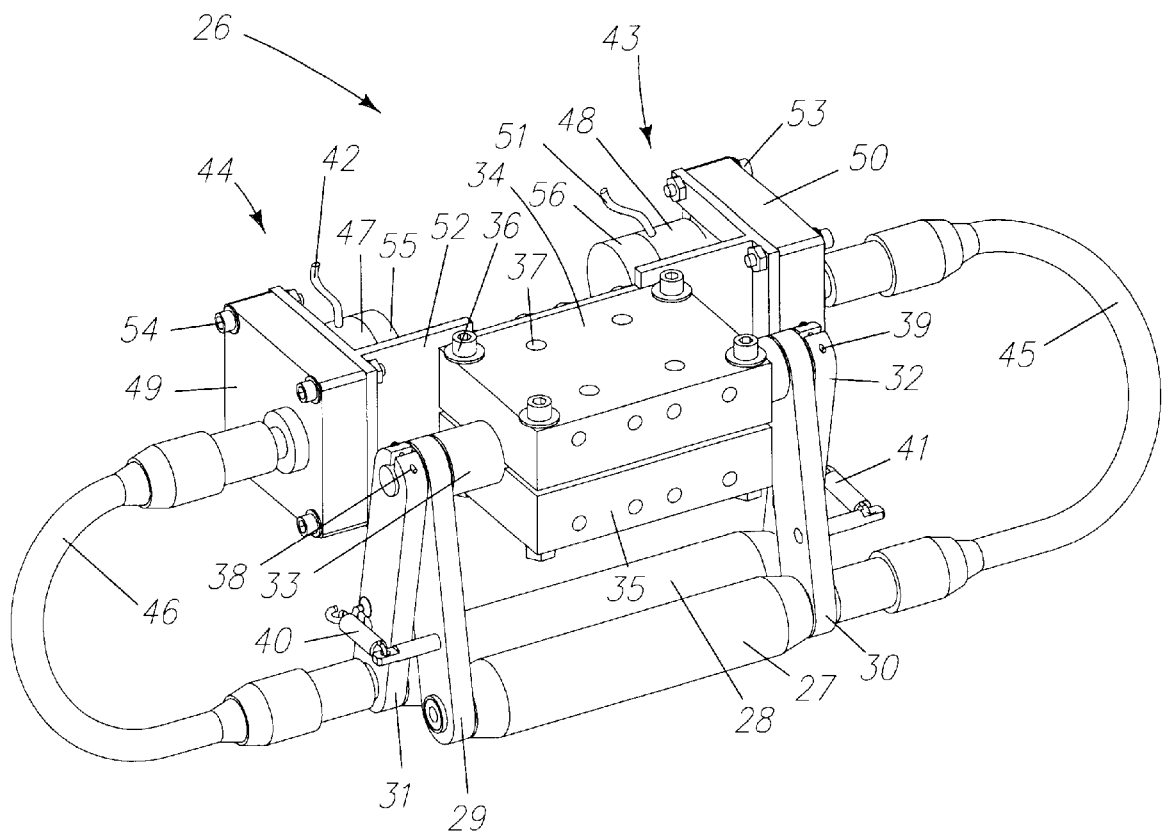
FIGS. 2A and 2B illustrate two perspective views of the grapple that has the basic functional characteristics depicted by FIGS. 1A and 1B.

Referring now to the drawings, the details of preferred embodiments of the present invention are graphically and schematically illustrated. Like elements in the drawings may be represented by like numbers.

FIG. 1A and FIG. 1B schematically illustrate the basic principle behind this invention. The grapple 10 comprises two rollers 11 and 12, which are able to rotate along their own axes 13 and 14 respectively. Both rollers 11 and 12 are powered and can rotate in both clockwise and counterclockwise directions. There are many ways to transmit torque to rollers 11 and 12, however, FIG. 1A and FIG. 1B are drawn without any source of power for the sake of clear illustration and understanding of the basic principle of this invention. Other figures in this document show the source of power and the method of transmitting power to the rollers. Two holding brackets 18 and 19 pivot relative to each other at one end around a pivot or hinge 20, and hold rollers 11 and 12 at their other ends. A bias spring 15 is connected to holding brackets 18 and 19 and biases holding brackets 18 and 19 toward each other. The surfaces 16 of rollers 11 and 12 are gripping surfaces. A gripping surface may be accomplished in the present invention by any of a number of means known to one of ordinary skill in the art. Examples include the surface 16 being covered by frictional material such as soft rubber, or being knurled, grooved, stippled or the like. As shown in FIG. 1A, when roller 11 is turned clockwise and roller 12 is turned counterclockwise, and the rollers come in contact with a sack, sack material 17 will be grabbed and dragged into grapple 10 due to the interaction (e.g., friction forces) between the rollers and sack material 17. As rollers 11 and 12 continue to turn, more sack material 17 will be dragged in between the rollers as shown in FIG. 1B. When sufficient sack material 17 has been grabbed, rotation of rollers 11 and 12 is stopped. This can be facilitated by a detector switch (described in later paragraphs) disposed in grapple 10 which issues a signal to stop rotation and lock rollers 11 and 12 when sufficient sack material 17 has been dragged into the inter-roller region between rollers 11 and 12. The friction between the rollers and sack material 17 will not allow the sack to slide out of grapple 10. Depending on sack material 17, an appropriate roller surface 16 can be selected to provide sufficient friction between rollers 11 and 12 and sack material 17 to hold the sack. As long as rollers 11 and 12 are locked and prevented from rotating and bias spring 15 pushes rollers 11 and 12 tightly together, and as long as the coefficient of friction between the sack material 17 and the rollers is sufficiently large, the sack will not slide out of grapple 10. While secured in this manner, the sack can be maneuvered by manipulating grapple 10 with a material handling device such as a robot arm, a hoist or similar means. When rollers 11 and 12 are rotated in the opposite directions, (i.e., roller 11 turns in counterclockwise direction and roller 12 turns in clockwise direction) sack material 17, which had been grabbed by rollers 11 and 12 will pass out of grapple 10 and the sack will be released. Another method of releasing the sack is to separate rollers 11 and 12 from each other. Bias spring 15 is disposed on holding brackets 18 and 19 to pull rollers 11 and 12 toward each other. However, any biasing mechanism that causes holding brackets 18 and 19 to push rollers 11 and 12 toward each other can be practiced in present grapple 10. Examples of such biasing means that can be used instead of or in combination with bias spring 15 include electric solenoids, electrostatic actuators, electric motors, pneumatic and hydraulic actuators.

Figure 2B:
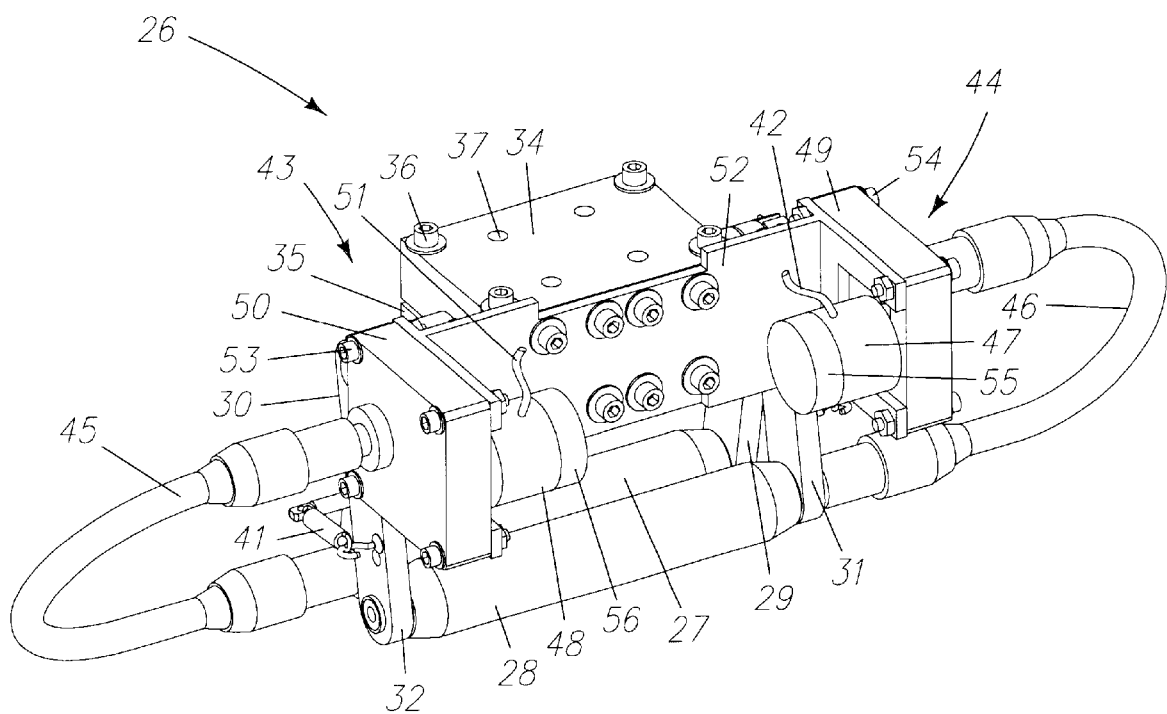

FIG. 2A and FIG. 2B show two different views of a preferred embodiment of the grapple 26 of this invention. A first roller 27 is able to rotate along its own axis while being received between two holding brackets 29 and 30. Similarly, a second roller 28 is able to rotate along its own axis while being received between two other holding brackets 31 and 32. Standard ball bearings, roller bearings or bushings can be installed in holding brackets 29, 30, 31 and 32 at the roller receiving points to allow smooth rotation of rollers 27 and 28.

A shaft 33 is held tightly between two horizontal shaft brackets 34 and 35. Fasteners 36 are used to hold shaft brackets 34 and 35 tightly together, thereby fixing shaft 33 between them. Shaft brackets 34 and 35 provide a mounting point at which grapple 26 may be attached to a robot or a material handling system. Attachment points 37 (e.g., threaded holes) may be provided on shaft brackets 34 and 35 to facilitate attaching grapple 26 to a material handling device. The overall function of two shaft brackets 34 and 35 is to hold shaft 33 and connect grapple 26 to a robot or to a material handling system.

Two holding brackets 29 and 30 holding the first roller 27 are free to rotate on shaft 33. Ball bearings, roller bearings, or bushings can be installed between shaft 33 and holding brackets 29 and 30 to allow smooth rotation of holding brackets 29 and 30. Holding brackets 31 and 32 for the second roller 28 are tightly fixed to shaft 33 and therefore do not turn or pivot on shaft 33. Fixing the second roller's holding brackets 31 and 32 to shaft 33 is accomplished in FIG. 2A by means of tightening screws 38 and 39, however, other fixing means are known in the art. This arrangement allows the first roller 27 to move relative to the second roller 28. Two biasing springs 40 and 41 pull holding brackets 29 and 30 of the first roller 27 toward holding brackets 31 and 32 of the second roller 28.

Rollers 27 and 28 are powered by respective actuators 43 and 44 via flexible shafts 45 and 46. Both actuators 43 and 44 are secured to a main bracket 52 via standard fasteners 53 and 54. Actuator 43, which turns the first roller 27, consists of an electric motor 48 coupled to a speed reducer transmission 50. Similarly actuator 44, which turns the second roller 28, consists of an electric motor 47 coupled to a speed reducer transmission 49. By properly powering actuators 43 and 44, rollers 27 and 28 are able to turn in both clockwise and counterclockwise directions.

Electric motors 47 and 48 employed in this embodiment were single phase 0.2 HP motors powered by a 24 VDC power supply via two multi-stranded power cables 42 and 51. Both speed reducer transmissions 49 and 50 have a speed ratio of 36. The output torque of the transmission speed reducer at 180 RPM is 65 lbf-inch. Two brakes 55 and 56 used in this embodiment were powered by a 24 VDC power supply through two multi-stranded power cables 42 and 51. The brakes are normally engaged when not powered electrically, and prevent the motor shafts from turning. When brakes 55 and 56 are electrically powered, they are disengaged, and the motor shafts were free to turn. Brakes 55 and 56 used in this embodiment were manufactured by Inertia Dynamics and produce 3 lbf-inch braking torque. Other actuator components are known in the art and are practicable in the present invention by the ordinary skilled artisan.

Two motors 48 and 47 are wired such that their respective rollers 27 and 28 turn in opposite directions when motors 48 and 47 are operated. When both motors 48 and 47 are operated such that rollers 27 and 28 turn inwardly, sack material 17 contacted by rollers 27 and 28, is grabbed and drawn in between the rollers. When sufficient sack material is grabbed in between rollers 27 and 28, the grapple controller (described in later paragraphs) stops motors 48 and 47, causing brakes 56 and 55 to engage and prevent rollers 27 and 28 from rotating. With the motors prevented from turning and rollers 27 and 28 locked (zero angular speed is generated for the rollers), sack material 17 will be secured between the rollers and the sack can be maneuvered by manipulating shaft brackets 34 and 35 of grapple 26. As long as rollers 27 and 28 pushed toward each other sufficiently by springs 40 and 41, and the coefficient of friction between sack materials 17 and rollers is sufficiently large, the sack will not slide out of grapple 26. When rollers 27 and 28 rotate outwardly, sack material 17 grabbed by rollers 27 and 28 will come out of grapple 26, and the sack will be released. Of course, an alternative means to release the sack material from grapple 26 is to separate rollers 27 and 28 from one another.

Although two biasing springs 40 and 41 were used in the illustrated embodiment, there are other methods of pushing the rollers together. For example, an active force generating component could be used to force the rollers against each other, such as an electric solenoid, a motor, or a pneumatic or hydraulic translational actuator (cylinder).

Figure 3:
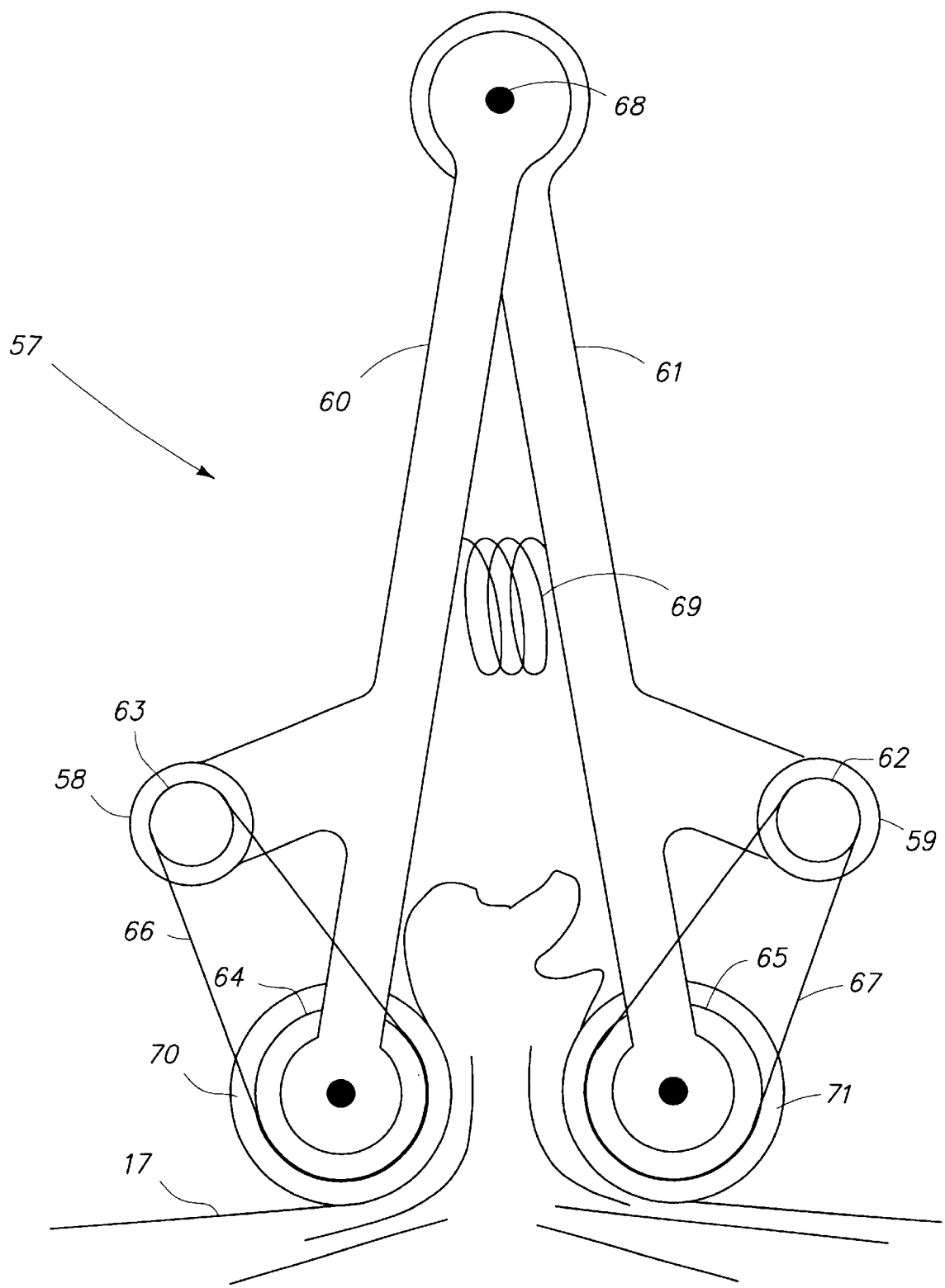
FIG. 3 illustrates the schematic concept of the mechanism of the grapple of FIGS. 4A and 4B where a sack has been grabbed and held by the grapple.

FIG. 3 is a schematic representation of a second embodiment of the grapple 57 of this invention. Two holding brackets 60 and 61 are pivotally connected at one end and pivot relative to each other about a pivot or hinge 68. The other end of holding brackets 60 and 61 receive and hold the ends of two rollers 70 and 71. A biasing spring 69 is connected to holding brackets 60 and 61 and pulls them toward each other. Two motors 58 and 59 rotate two rollers 70 and 71 of grapple 57. Motors 58 and 59 are installed on holding brackets 60 and 61. Motor 58 is connected to a drive sprocket 63 which in turn is coupled via a drive chain 66 to a driven sprocket 64. The driven sprocket 64 is in operative communication with the end of roller 70 to rotate roller 70 in response to operation of motor 58. Similarly motor 59 is connected to a drive sprocket 62 which in turn is coupled via a drive chain 67 to a driven sprocket 65. The driven sprocket 65 is in operative communication with the end of roller 71 to rotate roller 71 in response to operation of motor 59. A brake may be installed on at least one of the motors to prevent the rotation of rollers 70 and 71 when the sack needs to be held securely. The surfaces 16 of the rollers 70 and 71 are grabbing surfaces as described above.

Figure 4A:
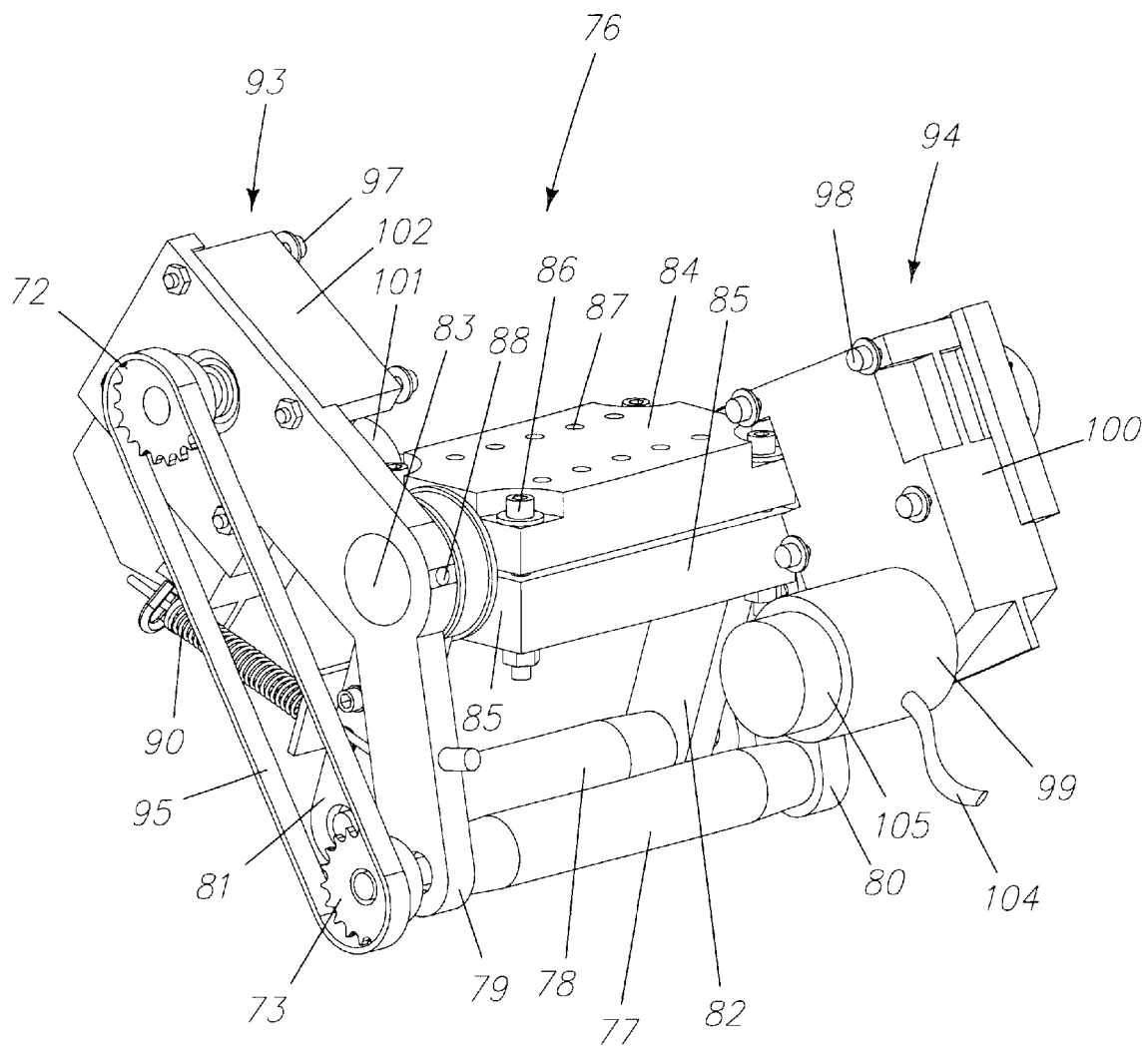
FIGS. 4A, 4B and 4C illustrate three perspective views of the grapple that has the basic functional characteristics depicted by FIG. 3.
Figure 4B:
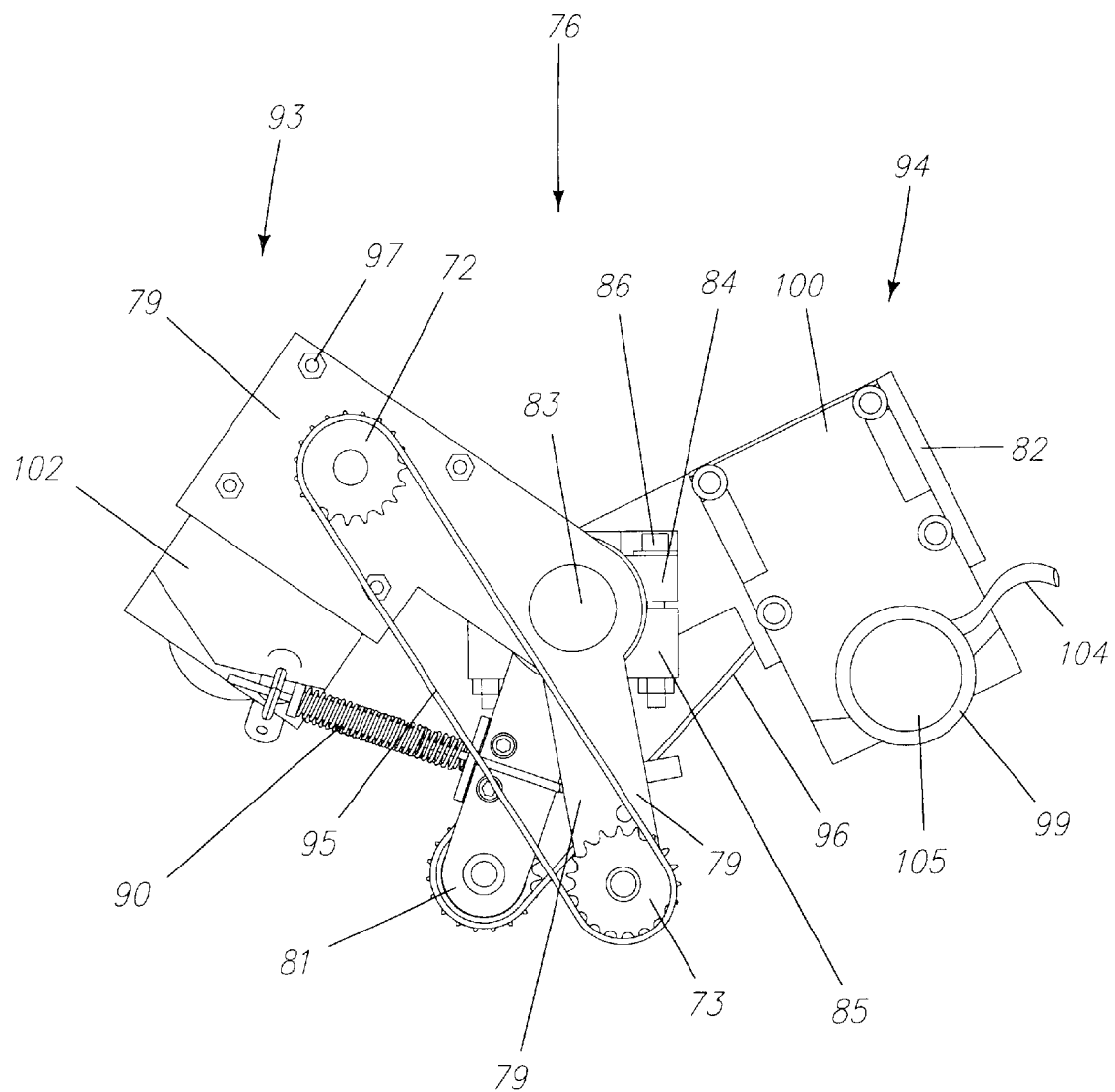
Figure 4C:
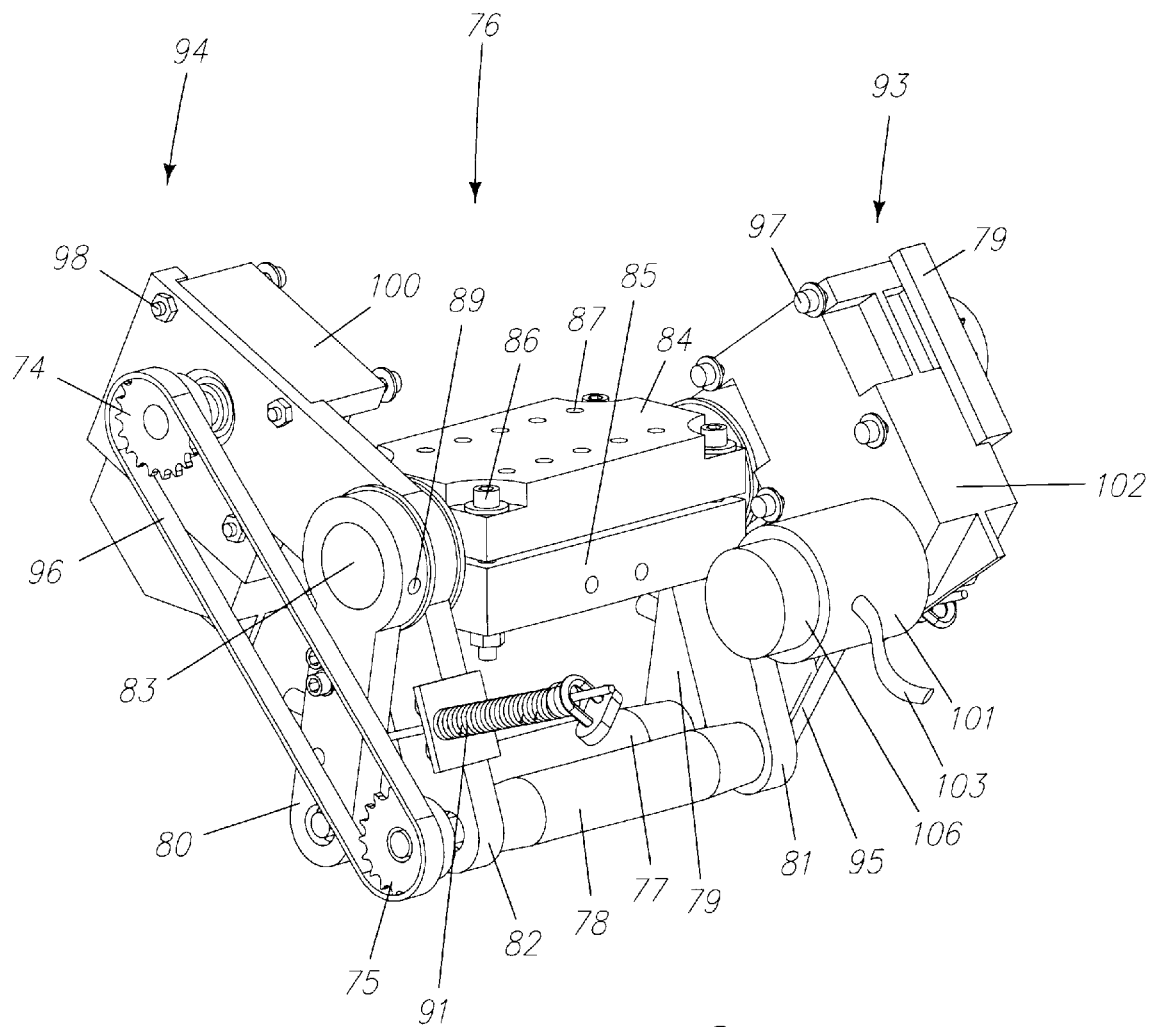

As the first roller 70 is turned counterclockwise by its motor 58 and the second roller 71 is turned clockwise by its motor 59, sack material 17 will be grabbed and dragged into the grapple 57 due to friction forces between the rollers and sack material 17. When sufficient sack material 17 has been grabbed, rollers 70 and 71 will stop turning, and the friction between the rollers and sack material 17 will retain the sack in grapple 57. This can be accomplished by installing a switch in grapple 57 as described in later sections. FIGS. 4A, 4B, and 4C show three different views of the actual mechanism which is designed based on the schematic concept of FIG. 3.

FIGS. 4A, 4B, and 4C show three different views of the actual grapple 76 of the second embodiment of this invention. A first roller 77 is able to rotate along its own axis while being held by two holding brackets 79 and 80. A second roller 78 is able to rotate along its own axis while held by two other holding brackets 81 and 82. As in other embodiments, standard ball bearings, roller bearings and bushings can be installed in ends of holding brackets 79, 80, 81 and 82 to receive the ends of rollers 77 and 78 and allow their smooth rotation.

Shaft 83 is held tightly between two horizontal brackets 84 and 85. Fasteners 86 hold two horizontal brackets 84 and 85 tightly together, thereby holding shaft 83 stationary in between horizontal brackets 84 and 85. Attachment points 87 (threaded holes) are included on horizontal brackets 84 and 85 to facilitate connecting grapple 76 to a material handling device. An object of horizontal brackets 84 and 85 in addition to holding shaft 83 is to enable connecting grapple 76 to a material handling system.

Two holding brackets 81 and 82 holding the second roller 78, are free to pivot or rotate on shaft 83. Bearings or bushings can be installed between shaft 83 and these holding brackets 81 and 82 to allow them to rotate smoothly. However, holding brackets 79 and 80 holding the first roller 77 are secured tightly to shaft 83 with the help of dowel pins 88 and 89, and therefore do not pivot or rotate on shaft 83. This arrangement allows the second roller 78 and its holding brackets 81 and 82 to rotate and move relative to the first roller 77 and its holding brackets 79 and 80. Biasing springs 90 and 91 bias rollers 77 and 78 toward each other.

Respective rollers 77 and 78 are powered by actuators 93 and 94 via two chains 95 and 96. As shown in FIG. 4A, actuator 93 is connected to a drive sprocket 72, which in turn is coupled via a drive chain 95 to a driven sprocket 73. The driven sprocket 73 is in operative communication with the end of roller 77 to rotate roller 77 in response to operation of actuator 93. Similarly actuator 94 (shown in FIG. 4C) is connected to a drive sprocket 74, which in turn is coupled via a drive chain 96 to a driven sprocket 75. The driven sprocket 75 is in operative communication with the end of roller 78 to rotate roller 78 in response to operation of actuator 94. Both actuators 93 and 94 are secured to holding bracket 79 and 80 respectively using standard fasteners 97 and 98. Actuator 93 comprises an electric motor 101 coupled to a speed reducer transmission 102. Similarly, actuator 94 comprises an electric motor 99 coupled to a speed reducer transmission 100. By properly powering actuators 93 and 94, rollers 77 and 78 are able to turn in both clockwise and counterclockwise directions.

Electric motors 99 and 101 employed in this embodiment are single phase motors which are powered by a 24 VDC power supply via two power cables 103 and 104. Two speed reducer transmissions 100 and 102 both have a speed ratio of 36. The output torque of the transmission speed reducer at 180 RPM is 65 lbf-inch. Brakes 105 and 106 are installed on motors 99 and 101 respectively. Brakes 105 and 106 employed in this embodiment are powered by a 24 VDC and are connected to the electric motor shafts. When the brakes are not powered electrically, they are engaged preventing the motor shafts from turning. When the brakes are electrically powered, they are not engaged and the motor shafts are free to turn. Brakes 105 and 106 used in the first embodiment are manufactured by Inertia Dynamics and produce 3 lbf-inch of braking torque. As we will discuss later, motors 99 and 101 will be powered such that both rollers turn in opposite directions. When both motors are powered such that both rollers turn inwardly, the sack material will be drawn in between the rollers.

When sufficient sack material is grabbed in between rollers 77 and 78, the grapple controller (described below) will stop the rollers and keep them stationary. Now if the rollers are locked or the motors are prevented from turning so zero angular speed is generated for the rollers, the sack will be secured in between the rollers and one can maneuver the sack by holding onto horizontal bracket 84 of the grapple. As long as the rollers are pushed tightly together by two springs 90 and 91 and the coefficient of friction between the sack material and rollers is sufficiently large, the sack will not slide out. When rollers 77 and 78 turn outwardly, the sack material which was grabbed by the rollers will come out and the sack will be released. Of course an alternative approach to release the sack is to separate rollers 77 and 78 from each other.

The control of the present invention can include a system of detectors or switches installed on the grapple to control its operation. The grapple of this invention (either 26 or 76) has three primary operational phases:

(1) Grabbing: rotating the rollers inward;
(2) Holding: preventing the rollers from rotating in any direction; and
(3) Releasing: rotating the rollers outwardly.

Depending on the application and sequence of operation, the grapple (either 26 or 76) can be forced into one of the three phases. The logic of how the grapple can be forced into a particular phase depends on how and where the grapple is being used. Users may need to consider many operational issues and safety concerns when developing a control system operating grapple 26 or 76. The following is an exemplary scenario of how a control system for grapple 26 or 76 may be accomplished.

A logic signal, $S_G$, is used to indicate the proximity of the grapple to a sack or an object to be grasped. A proximity detector is installed on the grapple and generates a signal ($S_G$ becomes 1) when the grapple is in close proximity of a sack or other object to be grasped. Rather than using a proximity detector to recognize the nearness of the sack to the grapple, one could use a electromechanical switch installed on the bottom of the grapple to issue a logic signal when the switch contacts the sack. Depending on the application, there are many ways of accomplishing a proximity detector that are known to and practicable in the present invention by one of ordinary skilled in the art. For example, the proximity detector can be an optical system or a vision system, for which control software can be used to identify the closeness of the sack to the grapple. In general, a logic signal (called $S_G$) is necessary to declare the closeness of the grapple to a sack. In its simplest form (e.g. when this grapple is used with a manual material handling device) the $S_G$ signal can be issued by the operator at the push of a switch.

Another logic signal, $S_H$, should be issued when sufficient sack material has been dragged in between the rollers. An electromechanical switch was installed in grapple 26 or 76 to send a signal ($S_H$ becomes 1) when sufficient sack material has been dragged in between the rollers.

Finally a third logic signal, $S_R$, is needed to flag that the sack must be released. Note that in many applications one may not want to release the sack until the sack is completely put on the floor while in other situations one may desire to release the sack upon a command from a computer or from an operator. In the first embodiment of this invention, a momentary switch was used to issue a release signal by the operator. A momentary switch is a switch that shorts (or opens) a circuit as long as it is held pressed.

The table of FIG. 5 illustrates the operational phases of the grapple for all possible combinations of the states of three signals $S_G$, $S_H$ and $S_R$. Note that there is only one combination of signals $S_G$, $S_H$ and $S_R$ which forces the grapple into the "Grab" phase. This combination is shown in row 5 of the table where $S_G$ is "1" (the grapple is close to the sack); $S_H$ is "0" (the sack is not completely grabbed) and $S_R$ is "0" (no command is issued to release the sack). Also note that there are three possibilities (rows 1, 3 and 7) that force the grapple into the "Hold" phase. Row 1 indicates the operation of the grapple when it is being maneuvered without any sack in the grapple while the grapple is not close to any sack and no signal is issued for release of the sack. Row 3 and row 7 indicate that sufficient sack material has been grabbed, therefore the grapple should hold the sack regardless of the state of $S_G$. The remaining combinations (rows 2, 4, 6, and 8) indicate the situation where the grapple is forced into the "Release" phase. The grapple is forced into the "Release" phase when $S_R$ is "1" regardless of the states of $S_G$ and $S_H$.

It is straightforward to generate the "Grab" and "Release" phases of the grapple: "Grab" indicates inward rotation of rollers 77 and 78 (to draw sack material into the grapple) while "Release" indicates outward rotation of rollers 77 and 78 (to eject material from the grapple). However there are many methods of forcing the grapple into "Hold" phase (preventing the rollers from turning in either directions.) One method is to install brakes on the motor shafts, on the transmission shafts, or on the rollers themselves or on any rotating component connected to the rollers. Brakes 105 and 106 (in grapple 76 of FIGS. 4A, 4B and 4C), and brakes 55 and 56 (in grapple 26 of FIGS. 2A and 2B) were electrically powered, and engaged the motor rotating shaft and stopped the shaft when they were not electrically powered. These brakes employ a spring to push its brake pad onto the rotating shaft when the brake coil is not electrically powered. When voltage is imposed on the brake coil, then the brake will disengage allowing the shaft to rotate. When the grapple is in the "Hold" phase, the power will be disconnected both from the actuators and the brakes. This causes the brakes to engage and no power is given to the actuators. It is also recommended that the terminals of the electric motors to be shorted when the grapple is forced into "Hold" phase. This option adds more braking torque (regenerative brake) to the rollers. An alternative to regenerative brake is to develop a closed loop position controller for the motors that drive the rollers. When the system is forced into "Hold" phase, a position controller controls the angular position of the rollers at their current positions and prevents the rollers from rotating in either directions. This approach, although more effective than shortening the terminals of the motors, might be relatively costly since it requires installation of the position sensors and feedback circuitry. Another attractive method for preventing the rollers from turning in either direction is to use a ratchet mechanism to stop the rollers. The ratchet, when engaged, would allow for inward rotation of rollers 77 and 78 (FIGS. 4A, 4B and 4C) during the grab mode, however it would prevent outward rotation. To release the sack, the ratchet would need to be disengaged, using a solenoid or manually, from the rollers for outward rotation of the rollers. Other means of locking or preventing the rollers from rotating are known to and practicable in the present invention by the ordinary skilled artisan.

Figure 6A:
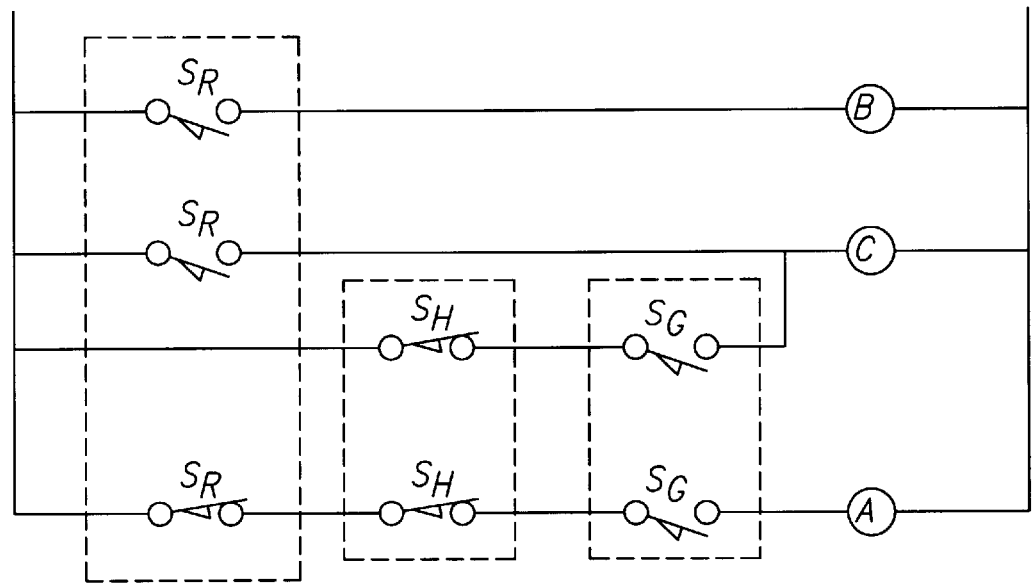
FIG. 6A illustrates how the relays are wired with switches and detectors to create the behavior described in Table of FIG. 5.
Figure 6B:
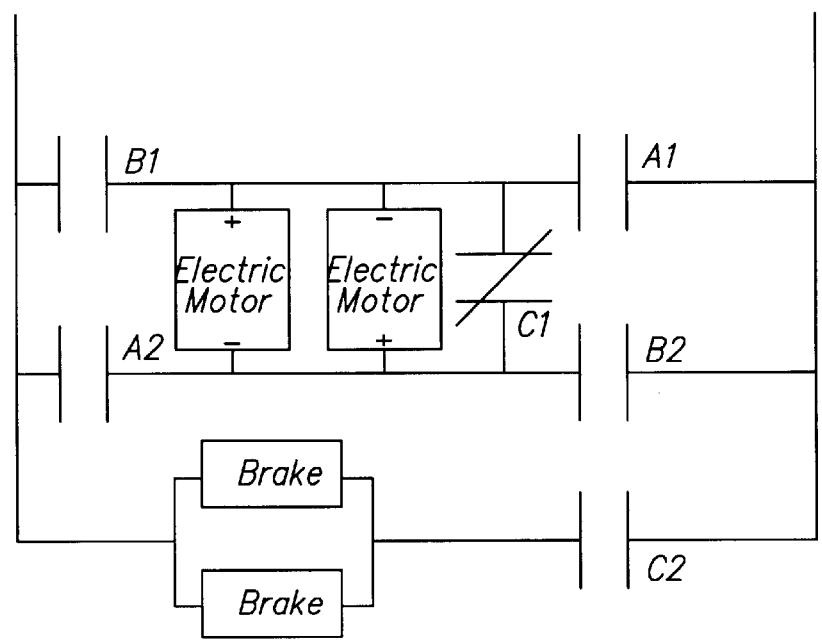
FIG. 6B illustrates how the contacts of three relays are connected to the electric actuators and the brakes.

FIG. 6A and FIG. 6B illustrate an exemplary control system practicable in the present invention to accomplish the operational phases described above and in the truth table of FIG. 5. Depending on the application, the three logic signals $S_G$, $S_H$, and $S_R$ can be generated by a variety of devices individually or in combination. In the present exemplary embodiments, the $S_G$ signal is generated by an electronic proximity detector and the $S_H$ signal and $S_R$ signal are generated by electromechanical switches (see later figures). Three relays A, B, and C are used to achieve the operational phases described above and shown in the truth table of FIG. 5. FIG. 6A is a schematic of how three signal sources (detectors/switches $S_G$, $S_H$ and $S_R$) were wired to power three relays A, B, and C for accomplishing the events and operational phases shown the table of FIG. 5. FIG. 6B is a schematic of how relays A, B and C (all with two contacts) are interconnected to form a control system or operation of the present invention. In the present example, it is assumed that all of the electrical components can utilize the same power source (24 Volt DC in this case). The normally open contacts of relays A and B (A1, A2, B1, and B2 shown in FIG. 6B) disconnect each motor's terminals from the voltage source. Relay C has two contacts: a normally closed contact C1 shorts the electric motors terminals, and a normally open contact C2 disconnects power from the brakes. When relay A and relay C are energized and relay B is de-energized, the terminals of the electric motors are connected to the power source via contacts A1 and A2, the brakes are connected to the power source via contact C2 (disengaging the friction pads) and the electric motors turn the rollers inward, and the "Grab" phase is accomplished. When the relays B and C are energized and relay A is de-energized, the terminals of the electric motors are connected to the power source via contacts B1 and B2, and the brakes are connected to the power source via contact C2 (engaging the friction pads) and the electric motors turn the rollers outwardly, and the "Release" phase is accomplished. When all relays A, B and C are de-energized, the terminals of both motors are shorted by contact C1, creating regenerative braking, and the brakes being disconnected from power source by contact C2 causes the friction pads to engage, and the rollers are held stationary, and the "Hold" phase is accomplished.

The schematic of FIG. 6A exemplifies how the signal sources $S_G$, $S_H$ and $S_R$, may be interconnected to power three relays A, B and C. The relay circuit can be powered by any appropriate power source as are known to and selectable by the ordinary skilled artisan, although here a 24 VDC is illustrated. In fact it is recommended that both circuits of FIG. 6A and FIG. 6B be powered by the same power. Signal source $S_G$ comprises a double pole proximity detector switch wired to have two normally-open contacts. Signal source $S_H$ is a double pole momentary switch and is wired to have two normally-closed contacts. Signal source $S_R$ is a triple pole momentary switch and wired to have two normally-open contacts and one normally-closed contact.

By inspection of FIG. 6A and FIG. 6B, one can see that the grapple of this invention can be forced into any of the operational phases shown in the table of FIG. 5 depending on the combined signal conditions of detectors and switches $S_G$, $S_H$ and $S_R$. For example, if detector/signal source $S_R$ is activated, regardless of signaling states of detectors $S_G$ and $S_H$, both relays B and C are powered and A is unpowered, and the "Release" phase is accomplished (see Row 2, 4, 6 and 8 of the truth table). If signal source $S_G$ is activated, while signal sources $S_R$ and $S_H$ are not activated, then both relays A and C are powered while relay B is unpowered, and the "Grab" phase is accomplished (see Row 5). Finally, if signal source $S_H$ is activated, regardless of the signaling state of detector $S_G$ but as long as signaling source $S_R$ is not activated, then all relays, A, B and C, are unpowered, and the "Hold" phase is accomplished (see rows 1, 3, and 7).

FIG. 7A and FIG. 7B illustrate one possible means for accomplishing a proximity detector to generate a $S_G$ signal. An electronic proximity detector 107 was used to detect the nearness of grapple 26 to an object to be grabbed or gripped. The proximity detector is disposed on the grapple to issue a $S_G$ signal when the object is detected within a predetermined distance. In FIGS. 7A and 7B, proximity detector 107 is installed on a detector mounting plate 108 via fasteners 109, and detector plate 108 is rigidly connected to mounting bracket 35 via fasteners 110. Detector plate 108 is configured to have an appropriate angle, so that the detector beam aims at the object or sack. The proximity detector issues a $S_G$ signal ($S_G$ becomes 1) when the grapple is close to the object. The proximity detector used in this embodiment was manufactured by Banner and sent a 5 VDC signal when an object is within 12 inches of the grapple. Alternatively, an electromechanical switch can be used as the proximity detector to generate the $S_G$ signal. Such electromechanical switch as a proximity detector can be activated either by the operator or by its contact with the object.

Figure 8A:
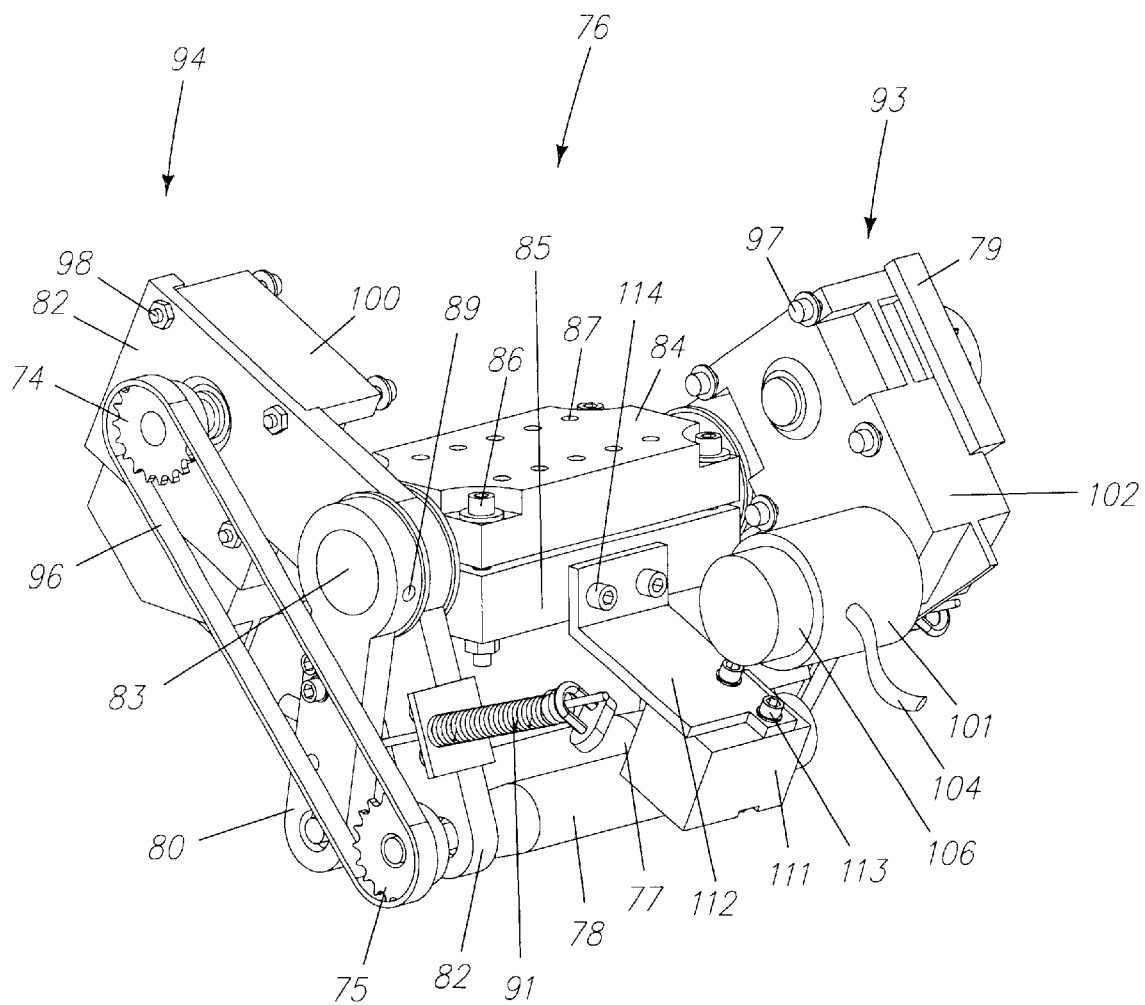
FIGS. 8A and 8B show the second embodiment of the grapple where a proximity switch is installed on the grapple to indicate the nearness of the sack to the grapple.
Figure 8B:
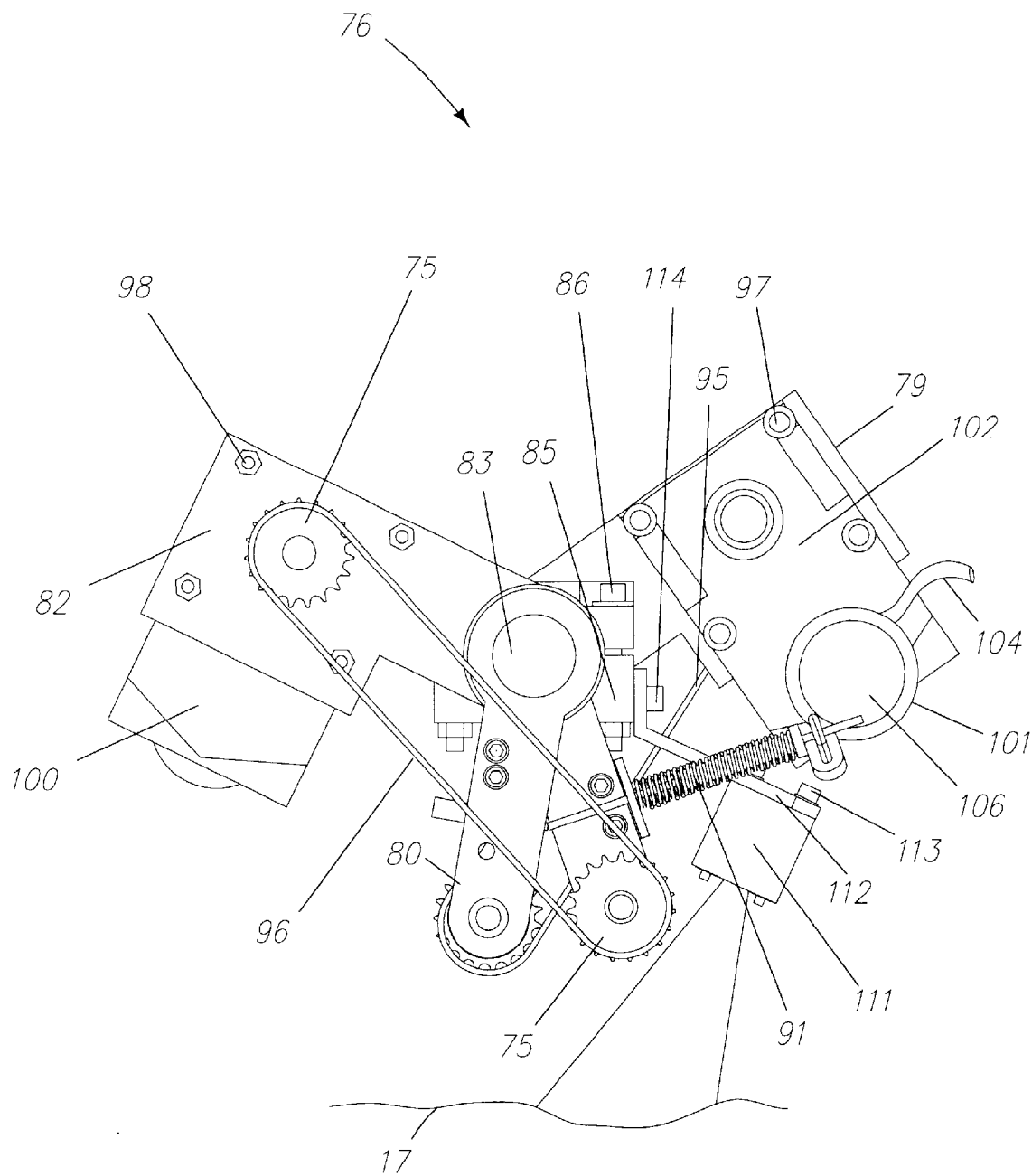

A similar arrangement can be used for installation of a switch on grapple 76 of FIGS. 4A and 4B (second embodiment of the invention) to issue a $S_G$ Signal. As shown in FIGS. 8A and 8B, an electronic proximity detector 111 was used to detect the distance from grapple 76 to an object to be grabbed. The proximity detector 111 is installed on a detector mounting plate 112 using fasteners 113 and detector mounting plate 112 is rigidly connected to mounting bracket 85 via fasteners 114. The detector mounting plate 112 is configured at an appropriate angle so that the detector beam aims at the object. Similar to grapple 26 shown in FIGS. 7A and 7B, proximity detector 111 issues a $S_G$ signal ($S_G$ becomes 1) when grapple 76 is close to a sack (e.g. 12 inch). There are other methods of generating a grab signal. One, for example, can install an electro-mechanical switch on the grapple to generate a grab signal. The eletcro-mechanical switch issues a signal ($S_G$ becomes 1) when it contacts the sack.

Figure 9A:
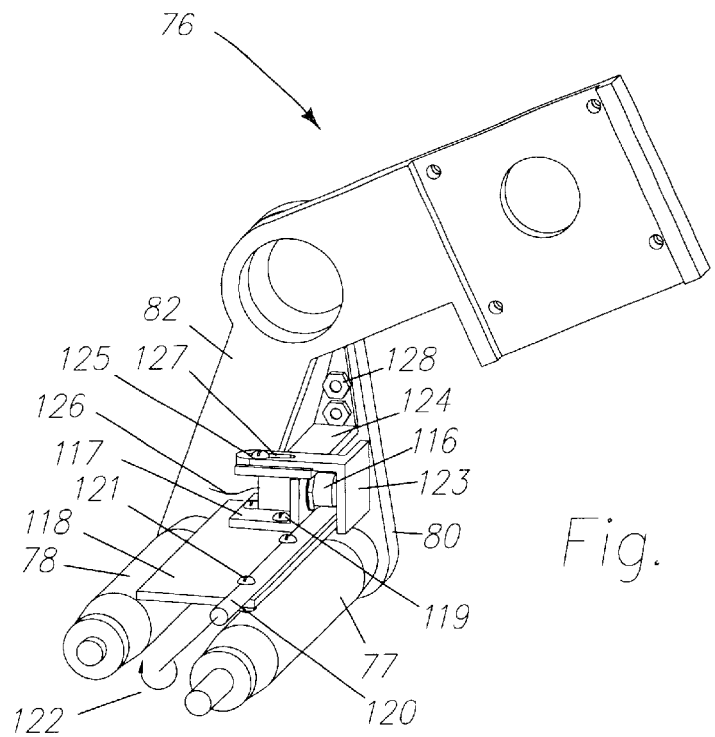
FIGS. 9A and 9B show two perspective views of the second embodiment of the grapple with a switch that issues a signal when enough sack material has been collected in between the grapple rollers.
Figure 9B:
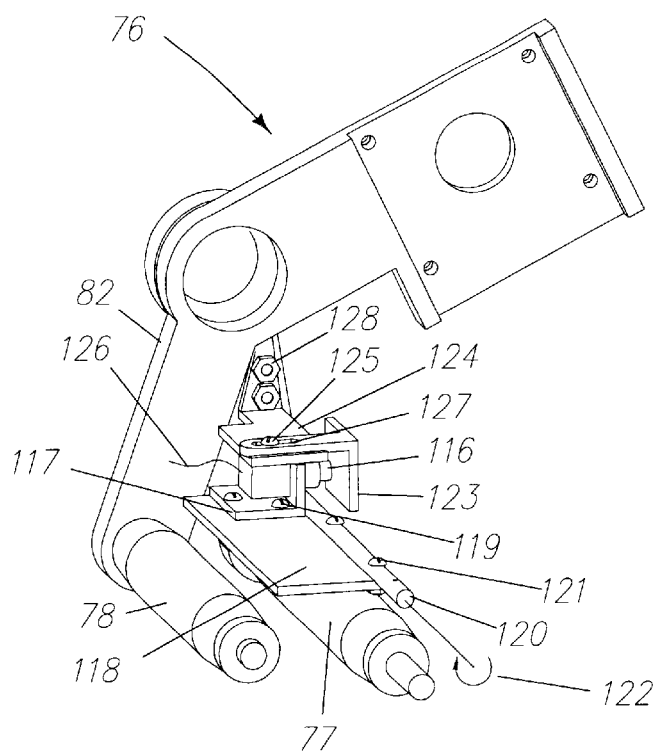

FIG. 9A and FIG. 9B show one possible configuration for installation of a switch to issue the $S_H$ signal for the second embodiment of this invention. These figures show perspective views of grapple 76 where holding brackets 79 and 81 are removed for clearer illustration of a switch that issues a $S_H$ signal. The detector assembly comprises a momentary wedge detector switch 116, installed on a first angle bracket 117, is disposed so it is activated when a sufficient amount of sack material has passed between rollers 77 and 78. The first angle bracket 117 is secured to a swivel plate 118 via fasteners 119. Swivel plate 118 is rigidly connected to a swivel shaft 120 via fasteners 121. Swivel shaft 120 is rotatably supported by holding brackets 79 (not shown) and 80, and is free to rotate around its own axis (i.e. in the direction of the arrow 122). A second angle bracket 123 is secured to a third angle bracket 124 via a fastener 125. A slot 127 on second angle bracket 123 allows for adjustment of the position of second angle bracket 123 relative to third angle bracket 124. The adjustment is necessary to assure that an appropriate degree of rotation of the swivel plate 118 along arrow 122 corresponds to a sufficient wedge of sack material, and causes wedge detector switch 116 to be pressed against second angle bracket 123. Third angle bracket 124 is secured to holding bracket 80 via fasteners 128. This arrangement allows second angle bracket 123 to be rigidly connected to holding bracket 80.

Figure 10A:
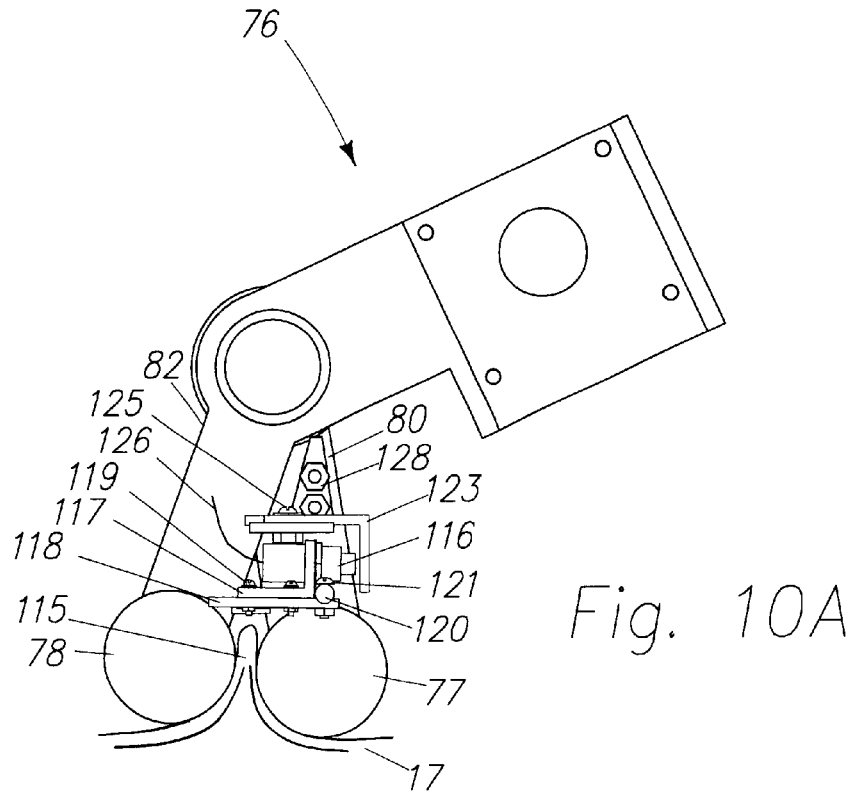
FIG. 10A shows the mechanism in the second embodiment of the grapple where sufficient sack material is not collected in between the rollers.
Figure 10B:
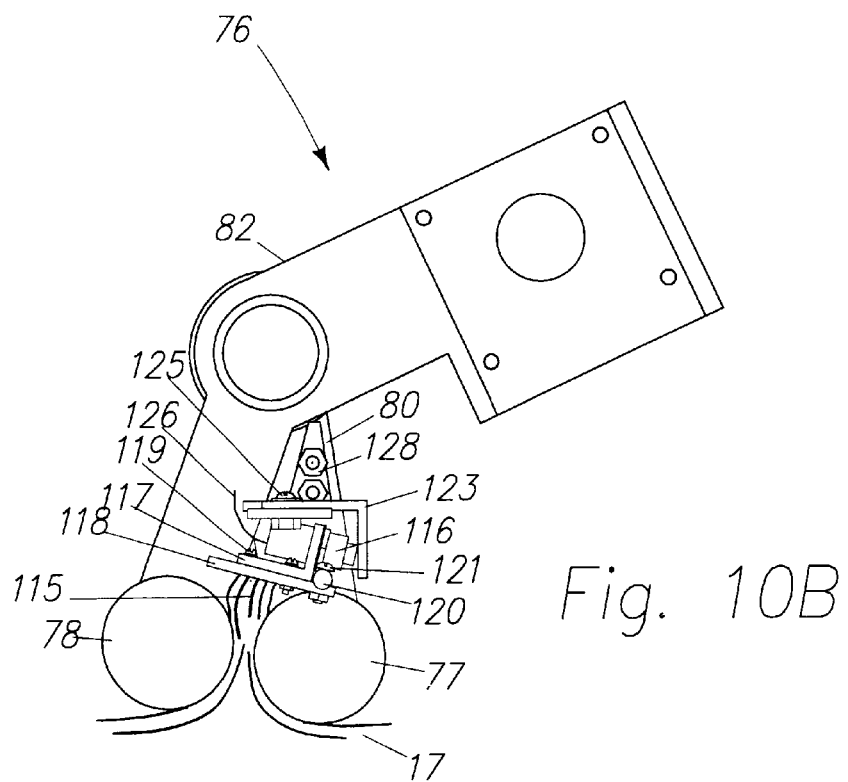
FIG. 10B shows the mechanism in the second embodiment of the grapple where sufficient sack material is collected in between the rollers and a switch has been activated.

FIG. 10A shows grapple 76 where swivel plate 118 is in its neutral position and wedge detector switch 116 is not activated. FIG. 10B shows grapple 76 when swivel plate 118 has turned in a clockwise direction due to the force from wedge 115 of sack material 17, and wedge detector switch 116 is pressed against second angle bracket 123. The more second angle bracket 123 is moved toward the right hand side along slot 127, the more swivel plate 118 must turn (in a clockwise direction) to press wedge detector switch 116 against second angle bracket 123. The $S_H$ signal generated by wedge detector switch 116 is transmitted via signal cable 126 to the rest of the control system. The method described above uses wedge 115 of sack material 17 to activate wedge detector switch 116 and cause a $S_H$ signal to issue. Alternatively, the wedge detector can be a displacement switch installed on grapple 76 that can be activated by displacement of rollers 77 and 78 apart. In other words, once rollers 77 and 78 are separated a predetermined distance due to a sufficient thickness of sack material 17 drawn between them, then the displacement switch (not shown) is activated and a $S_H$ signal issued. To issue a $S_H$ signal in grapple 26, a similar arrangement can be practiced.

Figure 11:
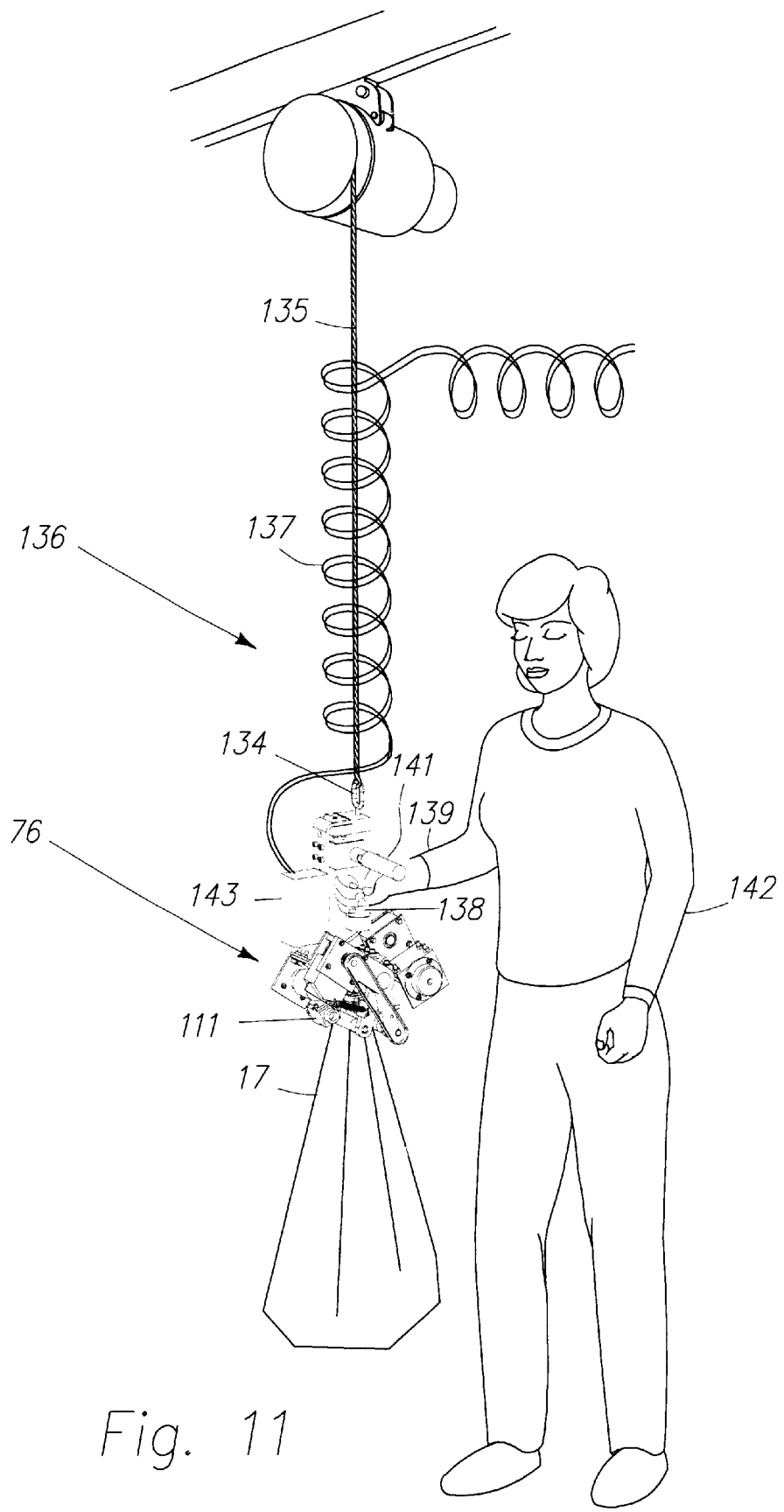
FIG. 11 shows the grapple installed on a manual material handling system where the operator is able to use her left hand to push a button and release the sack.

$S_R$ signal must be issued to release the sack. Depending on the application, there are many ways of creating this logic signal upon a command from a computer or from an operator. The grapples described in this invention can be used with a variety of material handling devices. FIG. 11 shows grapple 76 when used in conjunction with a hoist 136. Such hoist devices are used often on auto assembly lines, in warehouses and similar situations to manipulate loads. Grapple 76 is connected to a line 135. The grapple is equipped with a handle which is gripped by the human operator's hand 139 and contains a sensor. Using the measurement from the sensor, the hoists lift grapple 76. U.S. Pat.

Figure 12A:
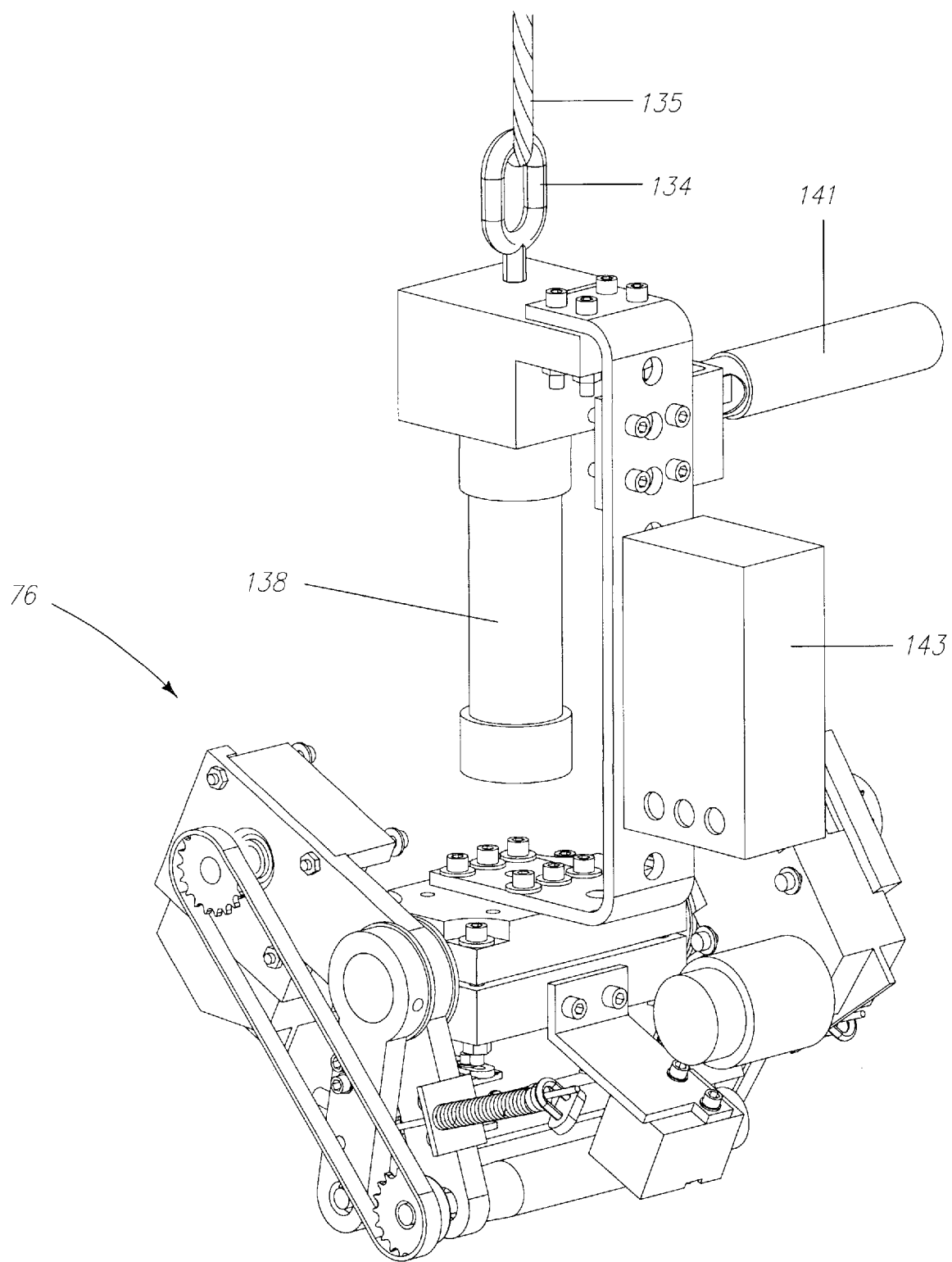
FIGS. 12A and 12B show two perspective views of the second embodiment of the grapple used in the material handling device of FIG. 11.
Figure 12B:
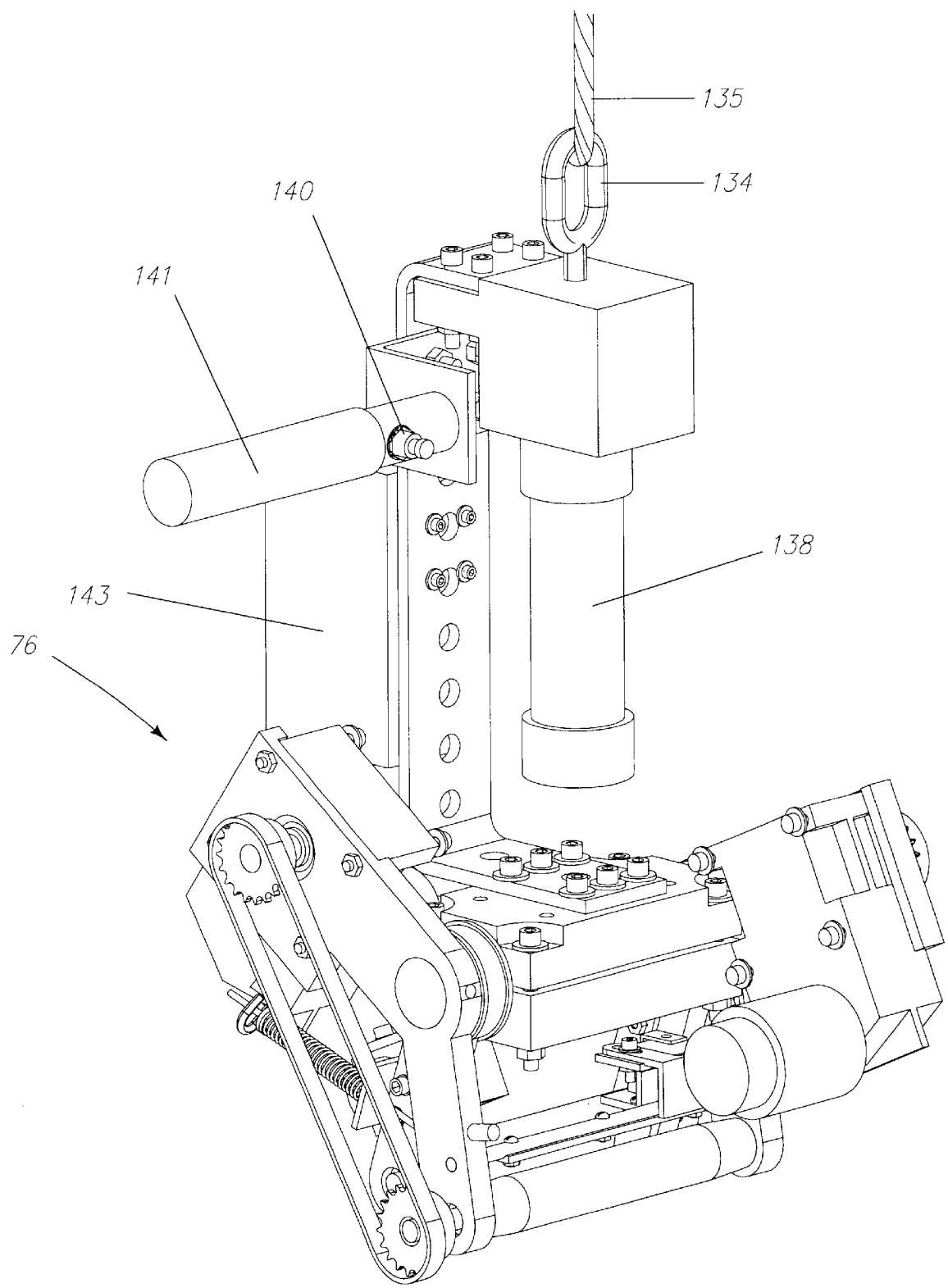
Figure 13A:
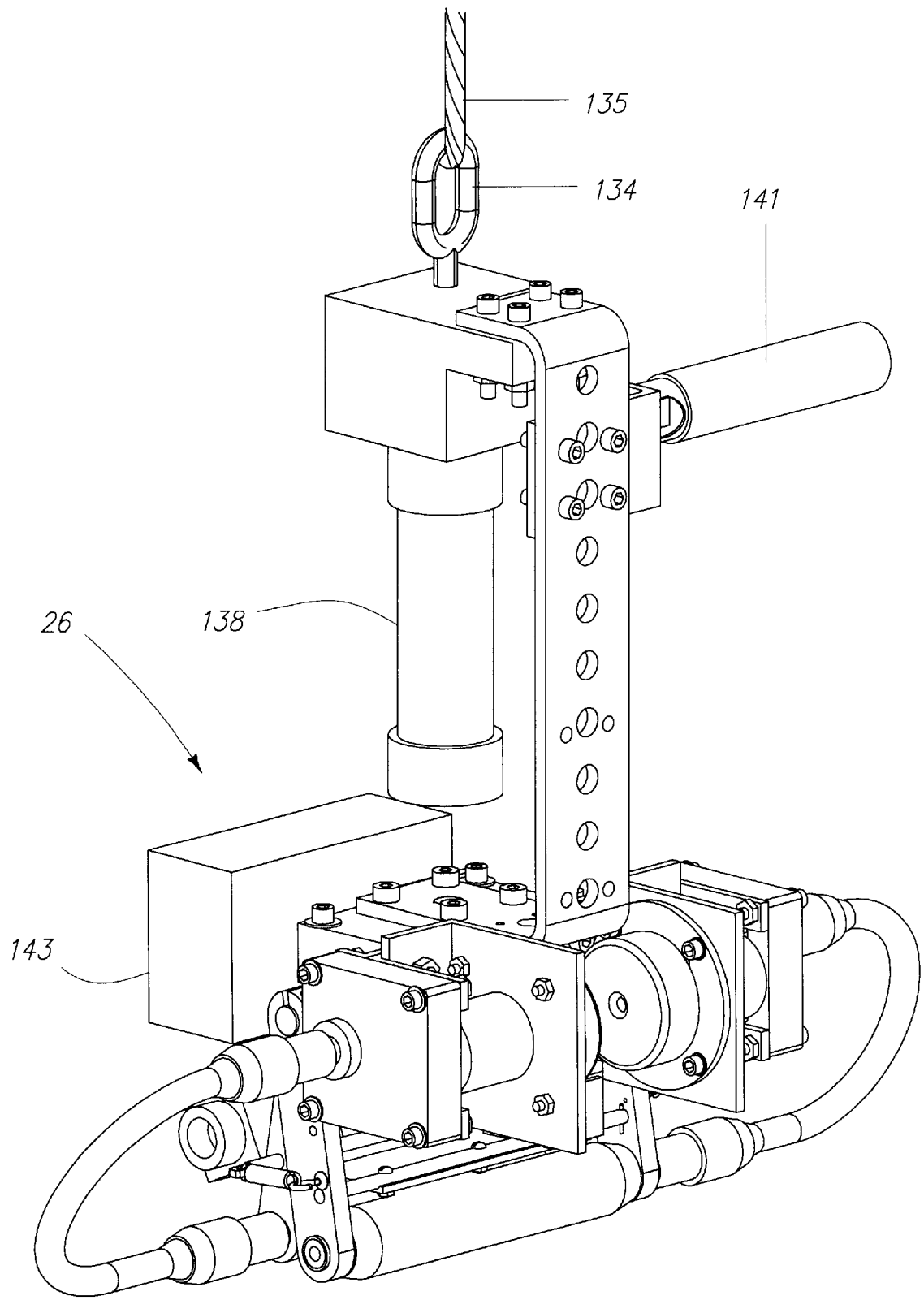
FIGS. 13A and 13B show two perspective views of the first embodiment grapple as it could be installed on the material handling device of FIG. 11.
Figure 13B:
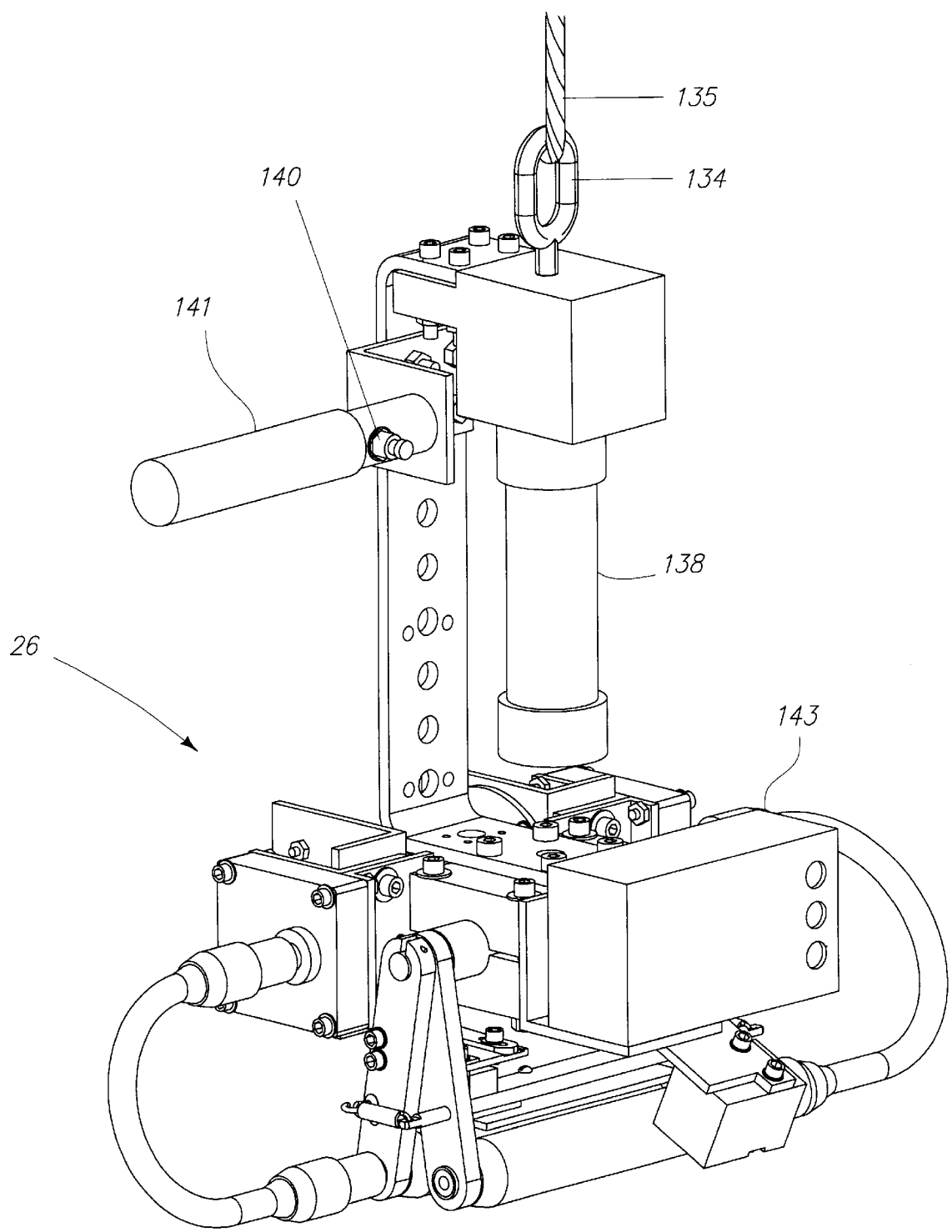

Nos. 5,915,673 and 5,865,426 describe some manual material handling devices and hoists that can be used with the present invention. As shown in FIG. 11, a cord 137 brings electric power to operate the grapple's electrical components. FIG. 12A and FIG. 12B are detailed views of grapple 76 when equipped to be used with a hoist 136. An eyelet 134 is used to hang grapple 76 from a line or cable 135. Handles 138 and 141 are installed on grapple 76 to be held by the operator's hands and include operator input devices that cause the vertical movement of grapple 76. A momentary switch 140 is installed on handle 141. When momentary switch 140 is pressed by the operator's left hand 142, a $S_R$ signal will be issued and the sack will be released. FIGS. 13A and 13B show similar arrangement when grapple 26 of FIGS. 2A and 2B is equipped to be used with a hoist 136. A momentary switch 140 is installed on handle 141, which when pressed by the operator, a $S_R$ signal is issued and the sack is released. An enclosure 143 houses the electronics and control system of the present invention.

Figure 14:
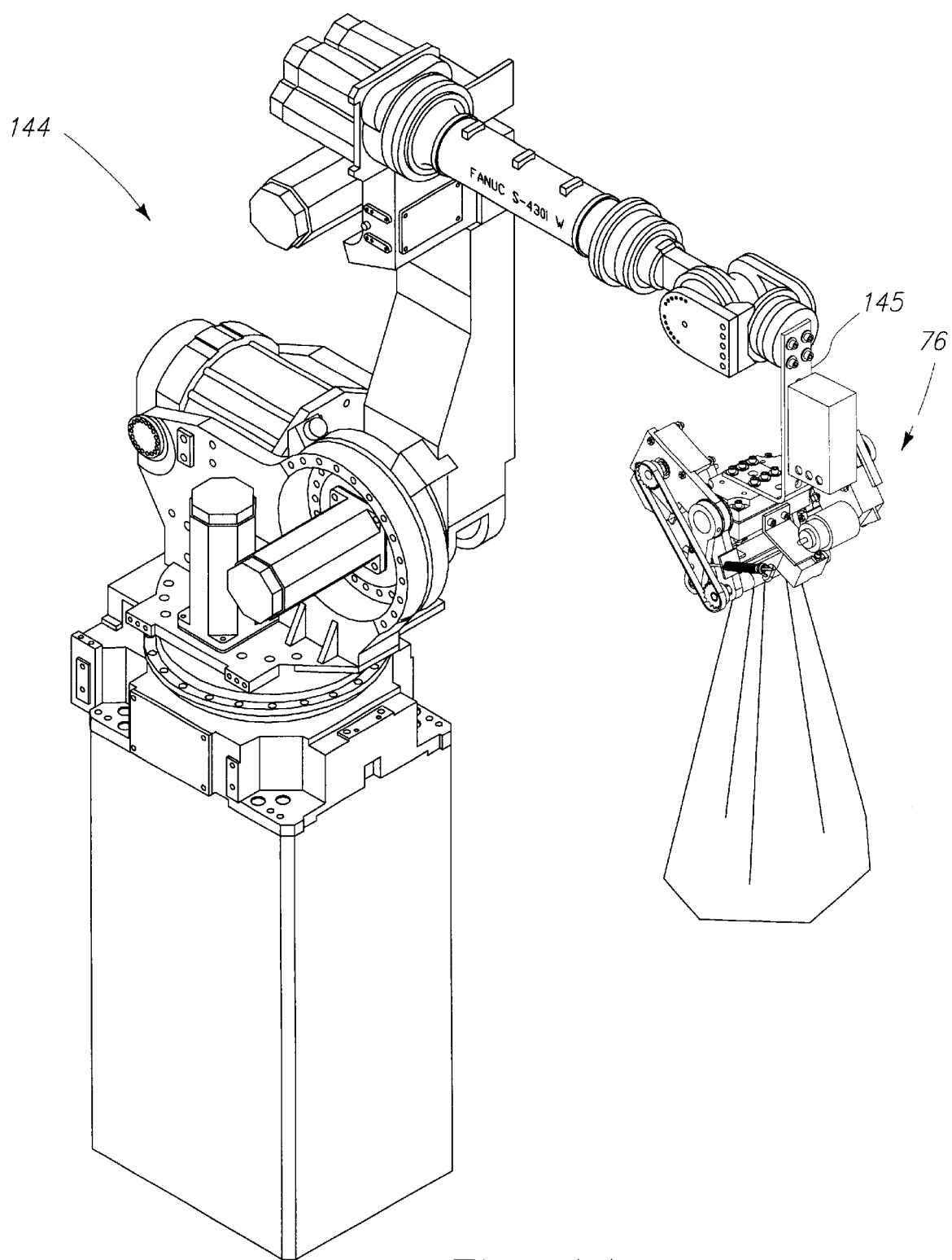
FIG. 14 shows the second embodiment of the grapple installed on a robot for grasping, lifting and maneuvering sacks.

FIG. 14 shows grapple 76 used with a robot 144. The L shaped connecting bracket 145 is used to connect grapple 76 to robot 144. As can be seen there is no manual switch in this case to issue the $S_R$ signal. The robot operating control system issues a $S_R$ signal when the sack reaches its target location.

Figure 15:
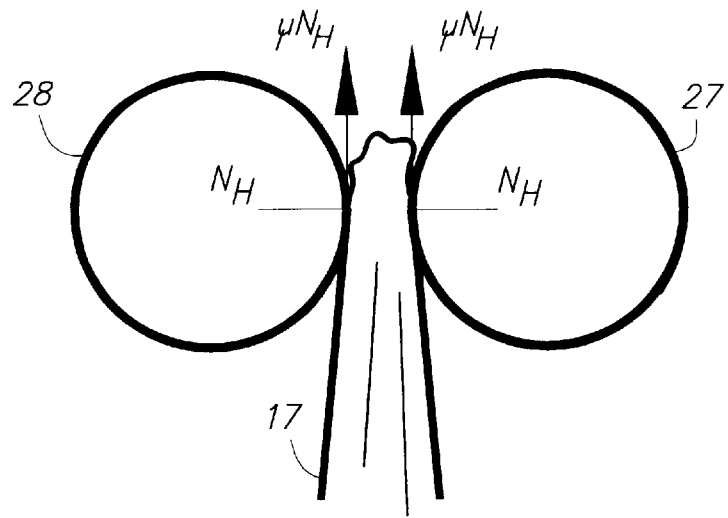
FIG. 15 shows the contact forces and friction forces between the rollers and sack when the sack is held in between the rollers.

A detailed description of the some of the important design issues associated with the grapple is given below. One important design issue is the calculation of the required torque during the "Hold" phase (i.e. when the sack material is dragged in between the rollers and the rollers have stopped turning). FIG. 15 shows that when sack material 17 is held between rollers 27 and 28 and lifted, the total upward friction forces imposed on sack 17 by rollers 27 and 28 is calculated by equation (1):

Upward Friction Forces=$2\mu N_H$ (1)

Where $N_H$ is the normal force imposed by rollers 27 and 28 onto sack material 17 during the "Hold" phase, and $\mu$ is the coefficient of friction between the rollers and sack material 17. To prevent the sack from sliding out of the grapple, the upward friction forces (described in equation 1) must be larger than the total of the maximum weight and the inertial force due to the maximum upward acceleration of the grapple as shown by inequality (2):

$$2\mu N_H \geq W_{max}\left(1+\frac{\alpha}{g}\right) \quad (2)$$

where g is the gravitational acceleration, $W_{max}$ is the weight of the heaviest sack to be lifted, and $\alpha$ is the maximum upward acceleration of the grapple induced by the robot or by the material handling device. If inequality (2) is not satisfied, sack material 17 will slide out of rollers 27 and 28. Therefore one must design the grapple with a large $N_H$ and large p to guarantee that the heaviest sack that must be lifted by a grapple cannot slide out. Inspection of FIG. 15 shows that the required torque to keep roller 27 stationary during the "Hold" phase is $T_H^{27} = \mu N_H R_{27}$ (3)

where $R_{27}$ is the radius of roller 27 and $T_H^{27}$ is the holding torque that should be imposed on roller 27 during the "Hold" phase. Comparing inequality (2) with equation (3) results in inequality (4) for the required holding torque on roller 27 during the "Hold" phase.

$$T_H^{27} \geq \left(1+\frac{\alpha}{g}\right)R_{27}\frac{W_{max}}{2} \quad (4)$$

Similarly the holding torque on roller 28 can be calculated from inequality (5):

$$T_H^{28} \geq \left(1+\frac{\alpha}{g}\right)R_{28}\frac{W_{max}}{2} \quad (5)$$

If the heaviest sack to be lifted by a particular grapple is 70 pounds, and the maximum maneuvering acceleration is 0.3 g, then if the rollers radius is 0.7", according to inequalities (4) and (5), one must impose at least 31.85 lbf-inch torque on each roller during the "Hold" phase.

Two electric brakes 55 and 56 are used in grapple 26 of FIGS. 2A and 2B to perform the "Hold" process. One must guarantee that brakes 55 and 56 generate sufficient holding torque on rollers 27 and 28 during the "Hold" phase. If the ratio of the angular speed of input shaft to the angular speed of output shaft of speed reducer transmission 49 is N, then the required braking torque for brake 55 can be calculated from inequality (6).

$$T_B^{55} = \frac{T_H^{27}}{N} \geq \left(1+\frac{\alpha}{g}\right)R_{27}\frac{W_{max}}{2N} \quad (6)$$

where $T_B^{55}$ is the minimum required torque for brake 55. A similar inequality can also be calculated for the minimum required torque for brake 56. Inequality (6) can also be used to size brakes 105 and 106 of grapple 76 in FIGS. 4A, 4B and 4C. It is preferred to choose a brake with excess braking torque capacity to compensate for inefficiencies and uncertainties in various components of the grapple.

In embodiments exemplified in the figures, a normally engaged electric brake manufactured by Inertia Dynamics was used. Normally engaged brake means that the brake does not allow rotation of the motor shaft when the brake is not electrically powered. Note that the holding torque of a brake is a function of the stiffness of the spring that is installed in the brake. The stiffer the brake spring, the more holding torque can be generated. Although more holding torque during the "Hold" phase assures that heavier sacks can be lifted, one must consider a trade-off: a brake with a stiff brake spring, and consequently large holding torque, requires a large amount of electrical energy to disengage. Designers must make sure that there is sufficient energy available in the electric power source that supplies the brakes. Usually the required electric current to disengage a brake at a given voltage is given by brake manufacturers and here it is referred to as $I_B$. The holding torque for the brake used in the first embodiment (grapple 26 in FIGS. 2A and 2B), when the brake is not energized electrically, is 3 lbf-inch. Since the transmission ratio is 36, the holding torque on each roller will be 108 lbf-inch. This is about 2.8 times larger than the required holding torque calculated by inequality (4) or (5). The required electric current to disengage the brake is 0.19 Amp at 24 VDC.

As discussed earlier, rather than using a brake, one can use other mechanisms (e.g. ratchet) to lock the rollers during the "Hold" phase. In design of any locking systems such as locking ratchets, one must guarantee that the required torque on each roller 27 and 28 during the "Hold" phase, given by inequalities (4) and (5), can be generated by the locking system.

Note that speed reducer transmissions 49 and 50 (in grapple 26 of FIGS. 2A and 2B) will not be back-drivable if they have large speed reduction ratios. This helps the grapple device during the "Hold" phase since the rollers will not spin outwardly by the force of sack weight and therefore sack material will not be released. In general the use of speed reducers that are non-back drivable (such as worm gears) may eliminate the need for brakes in the grapple device. Although worm gears and other non-back drivable speed reducers may be used in the grapples of the invention here, the use of brakes and latches is recommend to insure that the rollers are not spawn by sack weight and therefore sack is held securely between the rollers and is not released during the "Hold" phase.

The calculation of the torque required during the "Grab" phase needs more understanding of the "Grab" process. Three methods for calculating the "Grab" torque for three different scenarios are described below:

Method 1

Figure 16:
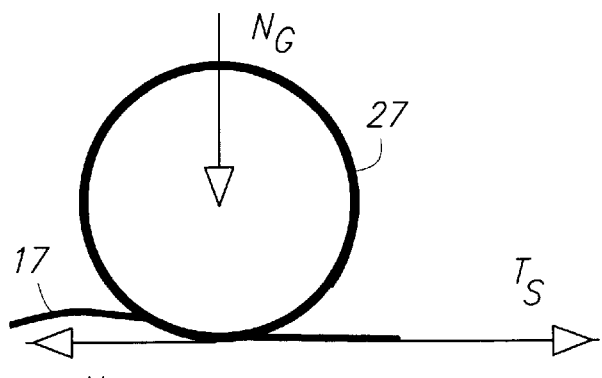
FIG. 16 shows roller in its initial engagement with the sack.

Usually during the "Grab" phase, the sack is rested on a floor or other surface. FIG. 16 shows a roller 27 in its initial engagement with sack material 17. The normal vertical force between roller 27 and sack material 17 is $N_G$. $N_G$ is the function of the normal vertical force being imposed on the grapple and the weight of the grapple. For example, if the grapple is connected to a manual material handling device (as shown in FIG. 11), $N_G$ is the function of the operator force on the manual material handing device. The more the operator pushes on the grapple, the greater the normal vertical force, $N_G$, will be generated. The friction forces onto the sack from each roller, $\mu N_G$, should be larger than the tension force, $T_S$, of sack material 17.

$$\mu N_G \geq T_S \tag{7}$$

The rollers of the grapple might not be able to properly engage with the sack material if the grapple is not pushed downward with sufficient force and if the coefficient of friction between the sack and the roller is small. To initiate the "Grab" phase successfully, therefore, both $\mu$ and $N_G$ should be sufficiently large to satisfy inequality (7). The torque needed to be imposed on roller 27 during the "Grab" phase is:

$$T_G^{27} = N_G \mu R_{27} \tag{8}$$

Considering inequality (7), the torque needed to be imposed on each roller 27 and 28 during the "Grab" phase are:

$$T_G^{27} \geq T_S R_{27} \tag{9}$$

$$T_G^{28} \geq T_S R_{28} \tag{10}$$

If both inequalities (9) and (10) are satisfied during the "Grab" phase, then the grabbing process will start successfully and sufficient sack material will be drawn between rollers 27 and 28. Over-stuffed sacks can result in a large tensile force and therefore it can be difficult to start the "Grab" process.

Method 2

Figure 17:
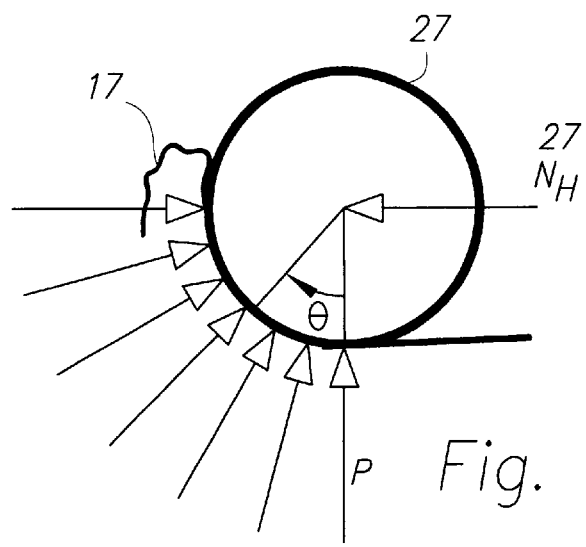
FIG. 17 shows the pressure profile on a roller.

As shown in FIG. 17, after enough sack material 17 is collected between the rollers, the pressure built up in between rollers 27 and 28 pushes them apart from one another as sack material 17 is squeezed between them. Suppose the pressure between sack material 17 and the roller per unit length of the roller's perimeter (circumference) is P, and that both rollers 27 and 28 have equal diameters, then equation (11) represents the force balance for roller 27 along the horizontal direction.

$$R_{27} \int_0^{\frac{\pi}{2}} (p\mathrm{Sin}(\theta) + p\mu\mathrm{Cos}(\theta))d\theta = N_H^{27} \tag{11}$$

where $N_H^{27}$ the horizontal force on roller 27 due to the force of bias springs (40 and 41 in FIGS. 2A and 2B). It is rather difficult to know the exact shape of the pressure profile on rollers 27 and 28, but since sack material 17 is compliant, sack material 17 will move between rollers 27 and 28 so an almost uniform pressure is created on the rollers. Substituting a constant value for P into equation (11) results in equation (12) for force $N_H^{27}$:

$$R_{27} P_o \int_0^{\frac{\pi}{2}} (\mathrm{Sin}(\theta) + \mu\mathrm{Cos}(\theta))d\theta = N_H^{27} \tag{12}$$

Or:

$$p_o R_{27}(1+\mu) = N_H^{27} \tag{13}$$

where $P_o$ is the constant pressure on the rollers. The torque that turns the rollers should be sufficiently large to overcome the friction forces due to the pressure on the rollers. FIG. 17 shows that the torque on roller 27 during the "Grab" phase, $T_G^{27}$, should be larger than the torque imposed on roller 27 by the friction forces:

$$T_G^{27} \geq \int_0^{\frac{\pi}{2}} pR_{27}^2 \mu d\theta \tag{14}$$

Substituting the constant value of $P_o$ for P in inequality (14) results in inequality (15) for the torque on roller 27 during the "Grab" phase.

$$T_G^{27} \geq p_o R_{27}^2 \mu \pi \frac{1}{2} \tag{15}$$

Substituting for $P_o$ from equation (13) into inequality (15) results in a relationship between the force $N_H^{27}$ and the "Grab" torque $T_G^{27}$.

$$T_G^{27} \geq \frac{\mu\pi}{2(1+\mu)} N_H^{27} R_{27} \tag{16}$$

Inequality (16) shows that the grab torque, $T_G^{27}$, on roller 27 is proportional to the normal force generated by springs 40 and 41. Inequality (16) also shows that the larger the force between the rollers due to bias springs, the larger torque is needed from each motor and transmission. If electric motor 48 and the transmission 50 cannot provide the torque represented by inequality (16), then roller 27 will be stalled.

Method 3

During high-speed operations, it is possible for the grapple to be moved upwardly by the robot before the "Grab" phase is completed. In other words, before the grapple is in the "Hold" phase, the grapple is moved upwardly by a robot or by a material handling device. In situations of this nature, to prevent the sack from falling, electric motors 47 and 48 and speed reducers transmissions 49 and 50 (FIGS. 2A and 2B) should generate enough torque on rollers 27 and 28 to assure that the rollers turn inwardly and draw enough sack material 17 between the rollers so the grapple goes into the "Hold" phase. This means that the required torque to be imposed on roller 27 during the "Grab" phase should be equal to or larger than the "Hold" torque from inequality (4):

$$T_G^{27} \geq W_{max}\left(1 + \frac{\alpha}{g}\right)\frac{R_{27}}{2} \quad (17)$$

Similarly the required torque to impose on the other roller 28 during the "Grab" phase can be calculated:

$$T_G^{28} \geq W_{max}\left(1 + \frac{\alpha}{g}\right)\frac{R_{28}}{2} \quad (18)$$

Of course inequality (2) must also be satisfied. Three inequalities (9), (16) and (17) offer three values for the grab torque on roller 27. An actuator and transmission must be selected such that the steady state output torque is larger than the largest torque value generated by inequalities (9), (16) and (17). The largest value for $T_S$, the tension force in sack material 17, occurs when the sack is lifted. As $T_S$ gets larger, inequality (9) approaches inequality (17). In other words, inequality (17) yields a larger value for grab torque than inequality (9). Also note that inequality (16) usually results in a smaller value for the grab torque than inequality (17). It is preferred to choose an actuator and transmission such that their torque capability is more than what inequalities (17) and (18) prescribe. In other words, the torque capability during the "Grab" phase should be the same as the torque capability during the "Hold" phase. Although inequalities (17) and (18) prescribe a conservative value for the grab torque, it demonstrates more assurance for a successful grasp during the "Grab" phase. In applications where the sacks are not totally filled and are not lifted before the "Grab" phase is completed, one might use a smaller actuator to guarantee inequalities (9) and (10) only. In the first embodiment of this invention, an actuator and a transmission speed reducer that has 65 lbf-in steady state output torque were used to drive each roller. It is preferred that users choose a DC motor with excess torque capacity to compensate for inefficiencies and uncertainties in various components of the grapple. Of course the actuator and the transmission must be able to provide more torque, for a short time, to accommodate for the transient inertial torque due to acceleration of rotating elements of the grapple and friction in moving components of the grapple.

Through many experiments, it was observed that rollers with radii 0.7" should turn with the speed of about three revolution/second for optimal operation. Small angular speeds for the rollers yield a slow grabbing process, while high speed rotation for the rollers may not allow the rollers to engage and grab the sack material. If the angular speed of roller 27 is $\omega$ revolution/seconds, the required power during the "Grab" is:

$$Power = \frac{T_G^{27}\omega}{1050} \quad HP \quad (19)$$

$$Power = \frac{T_G^{27}\omega}{1.4} \quad Watt \quad (20)$$

where the unit of $T_G^{27}$ is lbf-inch and $\omega$ is in revolution/second. Substituting for $T_G^{27}$ (i.e. 31.85 lbf-inch) and $\omega$ (i.e. 3 rev/sec) into equations (19) and (20) results in 0.091 HP or 68.25 Watts for the required power for the electric motor at 3 revolution/second (180 RPM). The above analysis also yields a value for the required current if an electric DC motor is used to impose torque on roller 27. If a DC power supply, with the voltage V, is used to power motor 48, then the current required by motor 48 is calculated by inequality (21).

$$I_M \geq \frac{T_G^{27}\omega}{1.4\ V} \quad Amp \quad (21)$$

If a 24 VDC power supply is used to power the motor, then the current drawn by motor 48 is calculated by inequality (22).

$$I_M \geq \frac{31.85 \times 3}{1.4 \times 24} = 2.84 \quad Amp \quad (22)$$

In the first embodiment, both the actuators and the brakes are powered with the same power supply to reduce the overall system cost. In that case inequality (23):

$$I_T \geq \frac{T_G^{27}\omega}{1.4\ V} + I_B \quad Amp \quad (23)$$

represents the total required current from the power supply to power both motor 48 and brake 56, where $I_B$ is the electric current required to disengage brake 56. Similar calculations can be developed to determine the current required to power motor 47 and brake 55.

The design issue associated with the friction between the rollers and the sack material is described below. A large coefficient of friction between rollers and the sack material can be achieved in many ways. One can knurl the rollers. Knurling is a process of putting a grip or roughened surface on a roller. The die which is engraved with a female impression of the design is pressed against the roller and sufficient pressure is applied to produce desired depth of impression. Knurl rollers are attractive, but they might damage the sacks. Another method of creating friction is to wrap the rollers with a rubber or rubber-like material that has a large coefficient of friction. However rubber with a large coefficient of friction usually wears off soon because it is soft. Inspection of inequality (2) shows that large values for $\mu$ and for $N_H$ allow the grapple to lift heavy sacks. However there is a trade-off and one cannot arbitrarily design a grapple with a large normal force, $N_H$, and a large and a large coefficient of friction, $\mu$. As can be seen from inequality (16), large values for $N_H$ and $\mu$ require high torque actuators. In other words, one should not arbitrarily choose a stiff spring to generate a large $N_H$; if large $N_H$ and $\mu$ are chosen to guarantee inequality (2), then a large actuator should also be chosen to overcome friction forces between the rollers as prescribed by inequality (16). Stiff springs create large normal force $N_H$ between the rollers and the sack material. A soft rubber surface on rollers 27 and 28 creates a large coefficient of friction between the rollers and the sack material. Practitioners must arrive at a value for the spring stiffness and rubber coefficient of friction so inequality (2) is satisfied with a reasonable margin. Over designed systems (i.e., very a large $\mu$ and $N_H$) will lead to an unnecessary large actuator and power supply. On the other hand, if the bias springs (40 and 41 in FIGS. 2A and 2B) are not stiff enough to generate a sufficiently large $N_H$ to satisfy inequality (2), the rollers will not be pushed against or oppose each other sufficiently, and the sack will slide down. Also note that rubber material with a large coefficient of friction wears off quickly and has a short life. We suggest that the grapple be designed with replaceable rollers. Once an optimal material (good coefficient of friction while the rubber has a long life) is chosen for the rubber on the rollers, one must choose a spring with proper stiffness for the grapple to yield an appropriate normal force to satisfy inequality (2). In general, a large coefficient of friction for rubber requires softer springs, and a small coefficient of friction requires stiffer springs. Low durometer Neoprene with $\mu=1$ was used for the first embodiment. The pre-load of the spring is adjusted to yield 50 lbf between the rollers to satisfy inequality (2). If the heaviest sack to be lifted by a particular grapple is 70 pounds and the maximum maneuvering acceleration is 0.3 g then inequality (2) will be satisfied as shown below:

$$2 \times 1 \times 50 \geq 70\left(1 + \frac{0.3\,g}{g}\right) \quad (24)$$

or:

$$100 \geq 91 \quad (25)$$

Alternative Embodiments

1. Grapple with Two Rollers Where Only One Roller is Powered.

Figure 18:
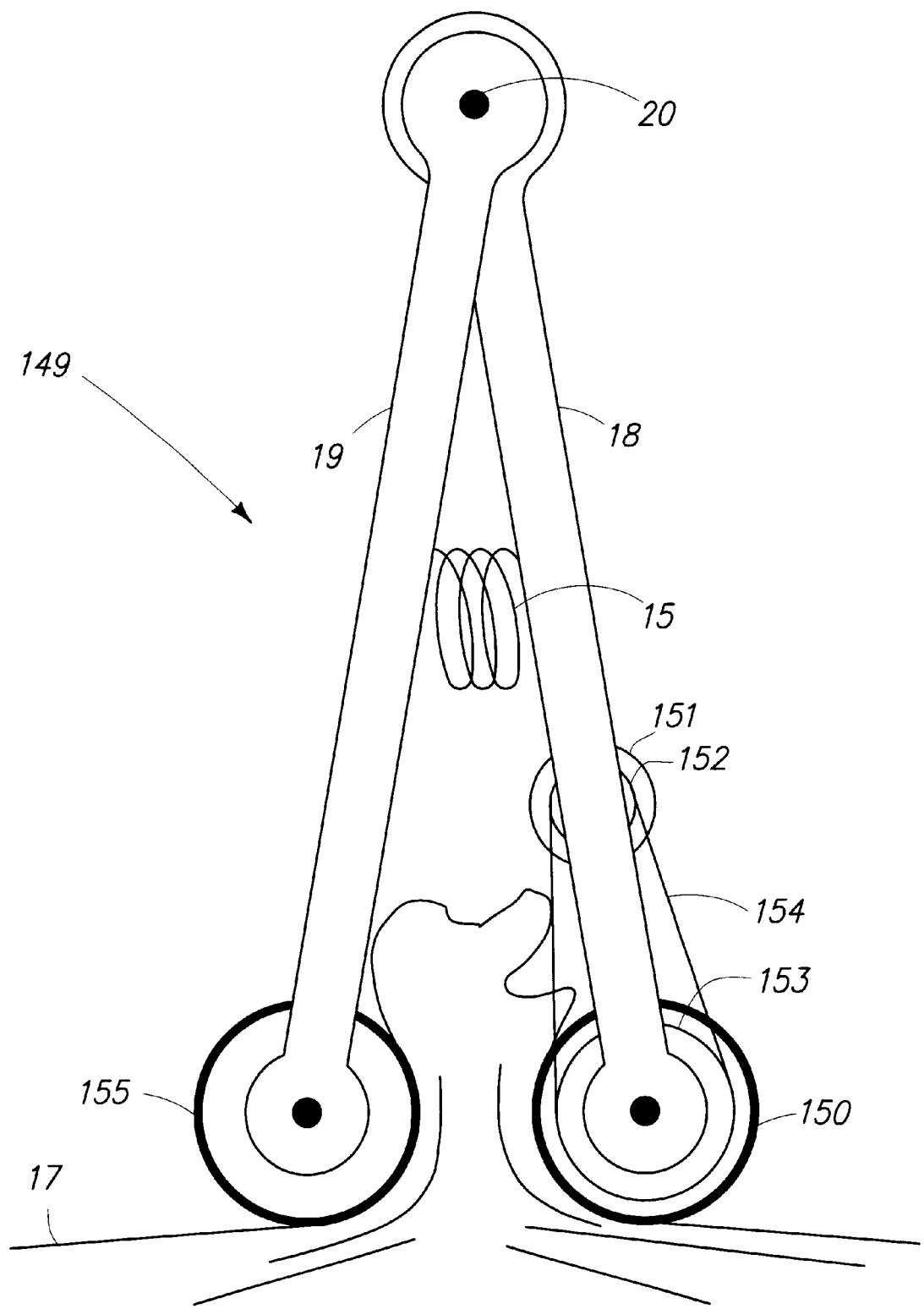
FIG. 18 shows a grapple where only one roller is powered by an actuator.

In this embodiment, an actuator powers only one roller. The actuator can be connected either directly to one of the rollers or indirectly via chains, belts or gears. Although rather simple and low cost, this configuration may lead to some slipping between the rollers, and between the rollers and the sack. Also note that this configuration can work with rollers having unequal diameters. FIG. 18 shows a grapple 149 where roller 150 is powered by an actuator 151. Two sprockets 152 and 153 and a chain 154 are used to transfer power to roller 150. As can be seen, the other roller 155 is not powered, but it turns in direction opposite to the direction of roller 150 since it is forced against roller 150 by use of a spring 15. Similar to the device depicted in FIGS. 2A and 2B, one can install brakes on grapple 149 to prevent the rotation of rollers 150 and 155 when the sack needs to be held securely. Alternatively, a ratchet mechanism can be employed to stop the rollers rotation when the sack needs to be held securely between the rollers. To release the sack one can either separate the rollers from each other or power roller 150 counterclockwise.

2. Grapple with Two Rollers Where the Rollers Move Linearly Relative to One Another In all above described embodiments, the rollers separate from each other or get close to each other on a circular path. However it is possible to design a grapple in which the rollers move relative to each other on a linear path. FIG. 19 is a schematic of a grapple 160 wherein rollers 161 and 162 are powered by actuators 163 and 164. Ball bearings or roller bearings 165, 166, 167 and 168 support rollers 161 and 162 while allowing for their rotation. Two parallel linear bearings 169 and 170 allow for linear motion of the housing of bearings 165, 166, 167 and 168. In other words both rollers can spin while they can move linearly relative to each other on two parallel linear bearings 169 and 170. Arrow 171 shows the direction of the movement of the rollers relative to each other. Tensile springs 172 and 173, connecting bearing 166 to bearing 165 and bearing 168 to bearing 167, pull rollers 161 and 162 toward each other. Again in this configuration, the rollers can be either powered directly or indirectly via gears, chains and belts by electric, pneumatic or hydraulic motors. Similar to the device shown in FIG. 18, one can power one roller only. FIG. 20 shows how grapple 175 is powered using flexible shafts. In this embodiment of grapple 175, one actuator 176 powers both rollers 161 and 162. The rotary motion from actuator 176 is transmitted to flexible shafts 177 and 178 via two mating gears 179 and 180, causing flexible shafts 177 and 178 to rotate in opposite directions.

3. Multi Roller Grapple

Figure 21A:
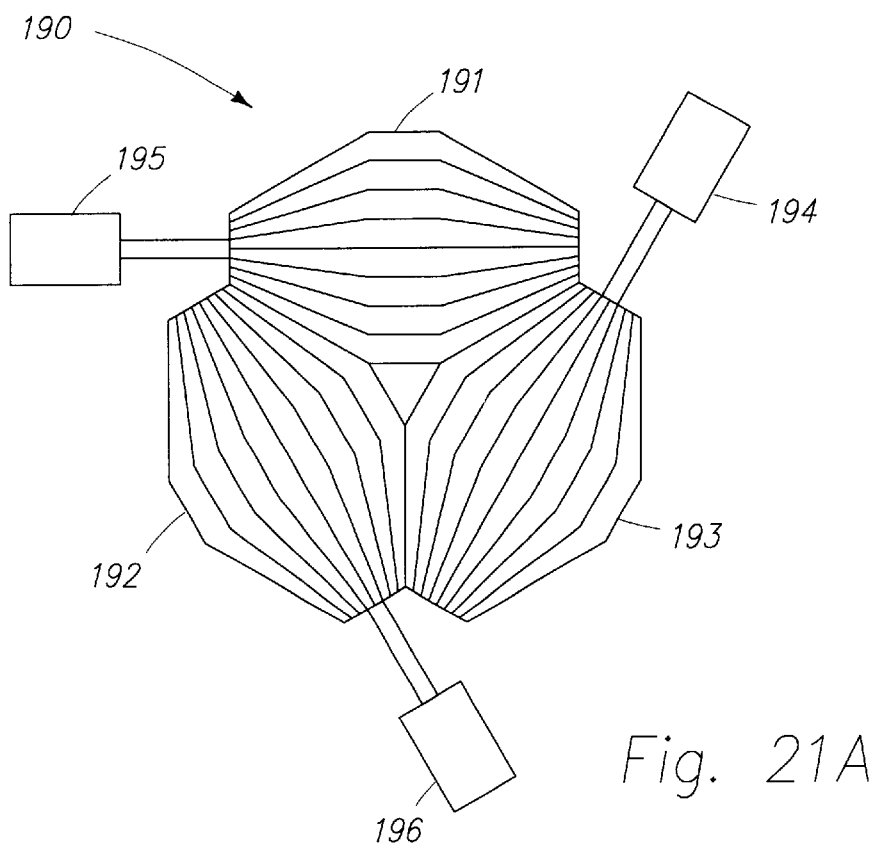
FIGS. 21A and 21B show a grapple where three rollers are used for grasping and holding sacks.
Figure 21B:
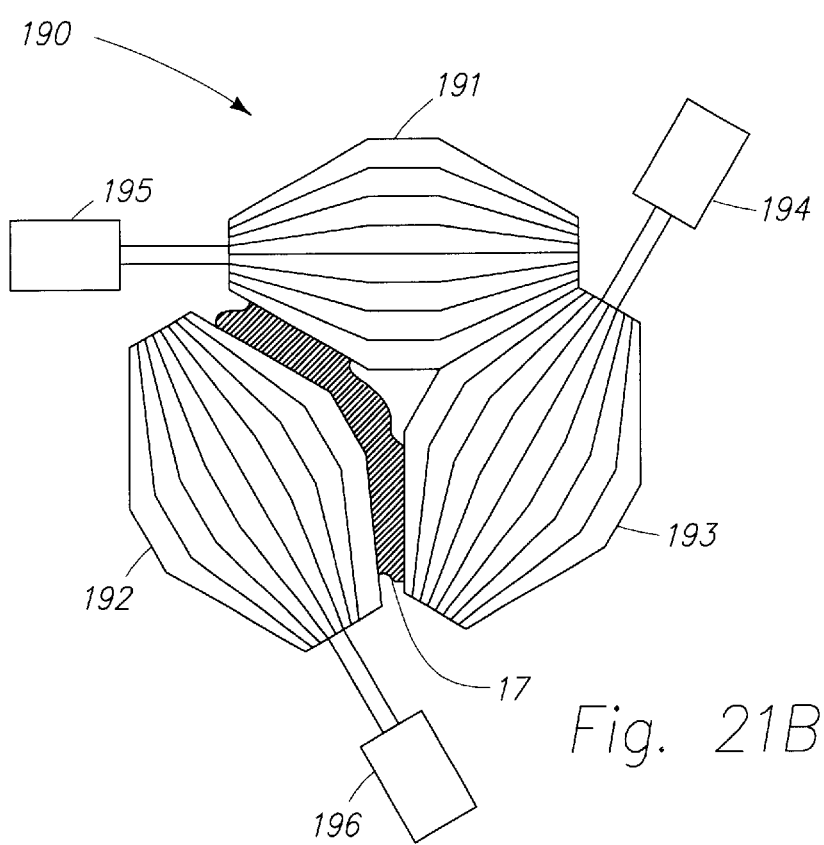

FIGS. 21A and 21B are schematic representations of another embodiment of the present invention, wherein three rollers 191, 192 and 193 are employed to grab sack material and hold sacks. The rollers of this grapple 190 are not parallel to each other and each roller axis is at a 60 degree angle with the others. FIGS. 21A and 21B show the case where the rollers are powered independently by three actuators 194, 195 and 196. The design principle for this architecture is similar to the system with two rollers in the sense that three rollers can separate from each other and allow the sack material to be grabbed in between the rollers. FIG. 21B shows the situation where roller 192 has been separated from the other two rollers to allow the sack materials to be dragged in between the rollers. Depending on the sack material and how the sack is left on the floor, it is possible that all rollers separate to hold the sack material in between them. Similar to the previous cases, to release the sack, one can either turn the rollers outwardly or separate them from one another.

4. Use of Non-Circular Rollers

Figure 22A:
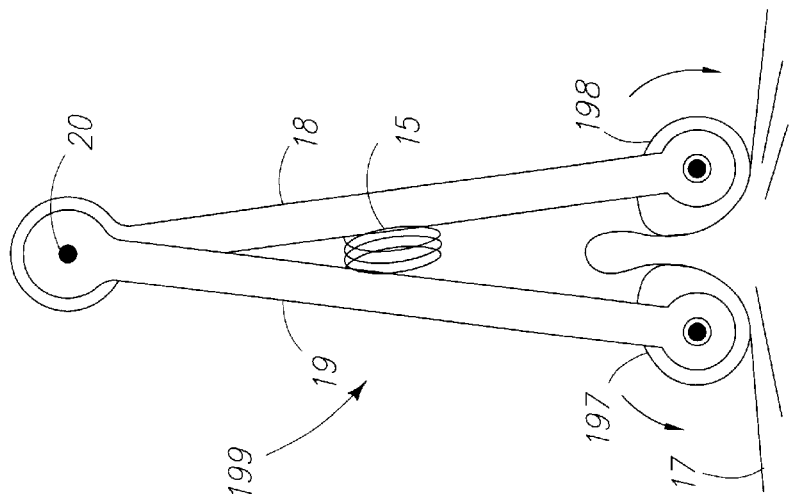
FIGS. 22A, 22B and 22C illustrate the schematic concept of the mechanism of the grapple that uses non-circular rollers.
Figure 22B:
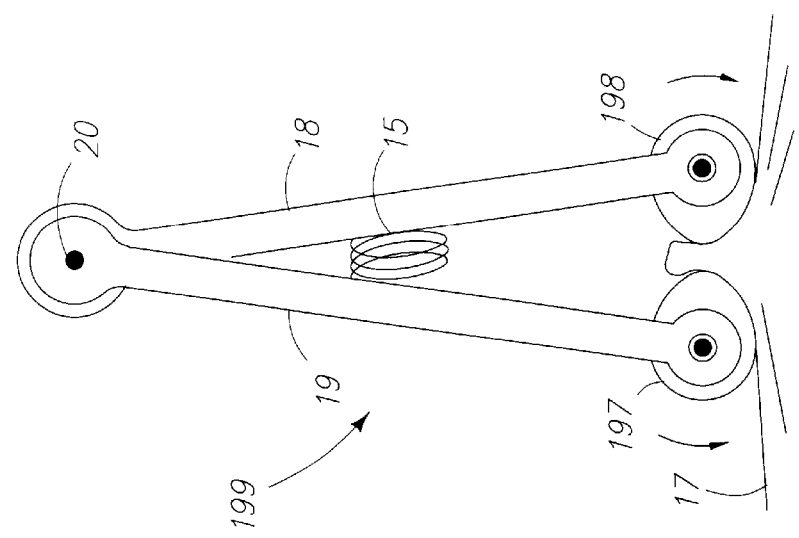
Figure 22C:
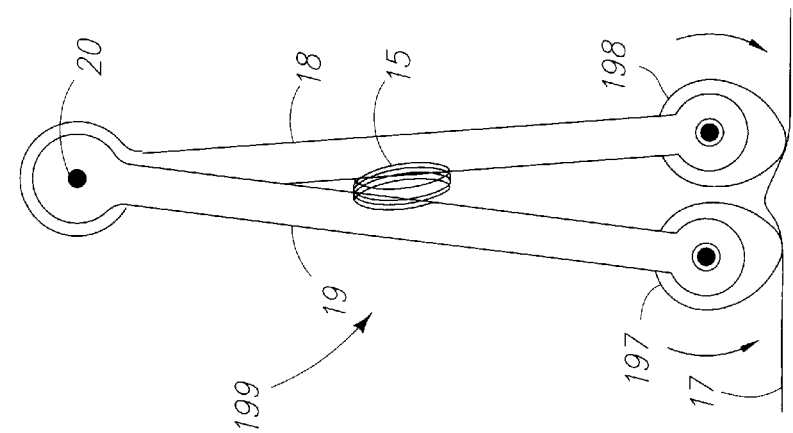

Circular rollers were utilized throughout our experimental designs. It is also possible to use rollers having an oval shaped cross-section. FIGS. 22A, 22B and 22C are schematic representations of a grapple 199 in which two oval-shape rollers 197 and 198 are employed to grab and hold sack material 17. FIG. 22A shows the initial configuration of the grapple where rollers 197 and 198 are initiating the grab process. FIG. 22B shows an intermediate position where the oval-shape rollers are forced toward each other on their smaller profiles creating a large normal force between the rollers. FIG. 22C shows the final configuration where rollers 197 and 198 have rotated and sufficient sack material 17 has been collected in between them. As shown in FIG. 22C, sack material 17 is locked in between the oval-shape rollers 197 and 198. Similar to grapples described previously, a spring 15, connected to holding brackets 18 and 19, is employed to bias oval-shape rollers 197 and 198 toward each other. One could use either one or two actuators to power rollers 197 and 198 of grapple 199.

Figure 23:
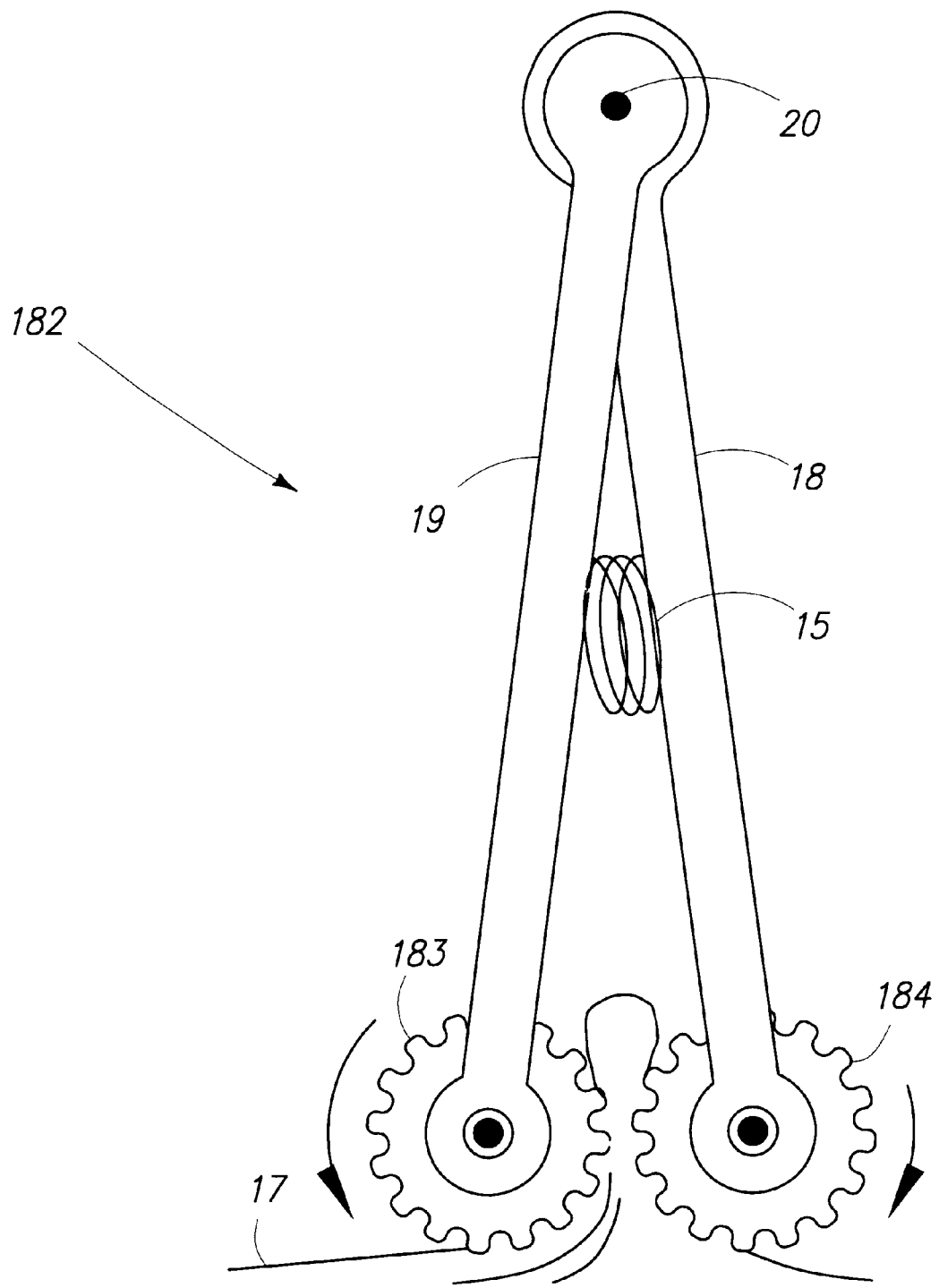
FIG. 23 illustrates the schematic concept of the mechanism of the grapple where the rollers have mating lobes.

One might use rollers with non-smooth surfaces. FIG. 23 shows a configuration of a grapple 182 where two rollers 183 and 184 have mating lobes. The increased surface contact between the lobes and sack material 17 will lead to larger friction forces for grasping and holding sacks. A spring 15, connected to holding brackets 18 and 19, is employed to force rollers 183 and 184 toward each other. Furthermore, one could use either one or two actuators to power rollers 183 and 184 of grapple 182.

Figure 24:
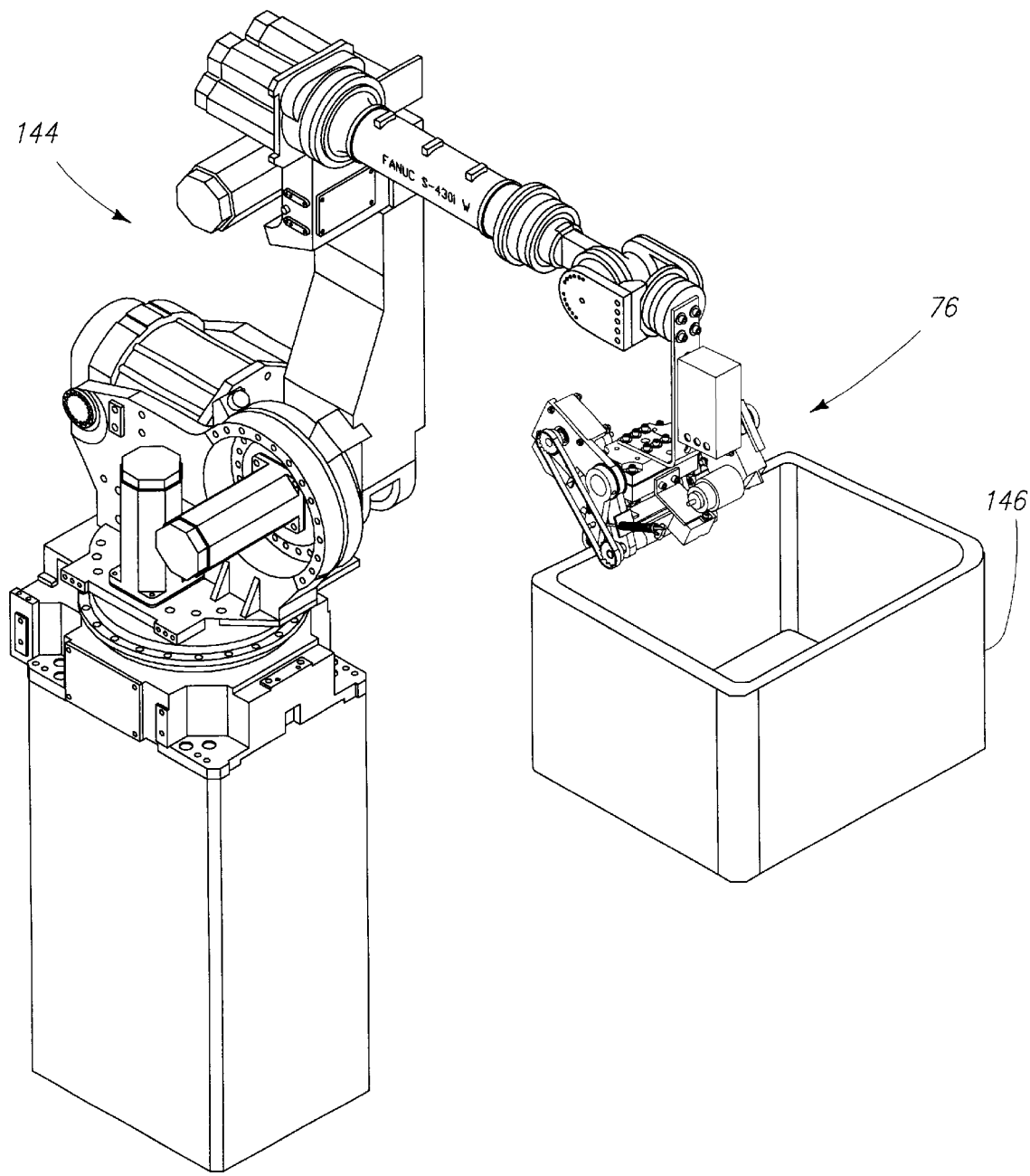
FIG. 24 illustrates how the second embodiment of the grapple is used to grab a box.

Although particular embodiments of the invention are illustrated in the accompanying drawings and described in the foregoing detailed description, it is understood that the invention is not limited to the embodiments disclosed, but is intended to embrace any alternatives, equivalents, modifications and/or arrangements of elements falling within the scope of the invention as defined by the following claims. For example, while many of the embodiments described above are for lifting a sack, these embodiments can also be used for lifting other types of loads that have components that can be squeezed in between the rollers. For example one can use grapple 76 (or grapple 26) to grab letter bins 146 as shown in FIG. 24. In general boxes without any top cover can be grabbed by this grapple easily where the grapple rollers can grab vertical edge of the box. Also note that one can use unequal diameters for rollers. However, the rollers' speed should be controlled such that the linear speeds of the rollers at the point of contact between the rollers remain equal. In all embodiments described here brakes were used on the motors to prevent the rotation of the rollers when the sack needs to be held securely. Alternatively, a ratchet mechanism can be used to stop the rollers' rotation in order to secure the sack. Additionally, to prevent the rotation of the rollers when the sack needs to be held securely, one might want to use non-back drivable actuators to power the rollers. To release the sack one can either separate the rollers from each other or power the rollers to turn outwardly. The following claims are intended to cover all such modifications and alternatives.

While the above description contains many specifics, these should not be construed as limitations on the scope of the invention, but rather as exemplifications of one or another preferred embodiment thereof. Many other variation are possible, which would be obvious to one skilled in the art. Accordingly, the scope of the invention should be determined by the scope of the appended claims and their equivalents, and not just by the embodiments.

What is claimed is:

1. A device mountable on a transport mechanism for contacting, grasping, holding and releasing an object having a deformable surface, comprising:
   a mounting bracket mountable to said transport mechanism;
   a first and a second roller, each roller having a roller axis, and each being rotatably supported on said mounting bracket and rotatable about its axis; further each of said rollers having a roller surface being a dragging surface for engaging and drawing said deformable surface of said object;
   a drive means for rotating at least one of the said rollers;
   a holding means selectively operable to releaseably engage at least one of the said rollers, and prevent rotation of the roller when engaged;
   wherein when said holding means is not engaged, said drive means turns said first roller along a first direction, and said roller surface of said first roller is placed into contact with said deformable surface of said object, said first roller surface draws said deformable surface of said object into an inter-roller region between said first and second rollers, thereby grasping said object;
   and wherein when said holding means is engaged and said deformable surface of said object is located in said inter-roller region, the contact between said deformable surface of said object and said first and second rollers causes said object to be held by said device.

2. The device of claim 1 wherein the holding means for preventing the rotation of said rollers is a friction brake.

3. The device of claim 1 wherein the holding means for preventing the rotation of said rollers is a ratchet mechanism.

4. The device of claim 1, further comprising a releasing means operatively connected to at least one of the said rollers and selectively operable to allow said deformable surface of said object to pass out of said inter-roller region causing said object to be released.

5. The device of claim 4, wherein said releasing means comprises said drive means being selectively operable to rotate said first roller in a second direction to draw said deformable surface of the said object out of said inter-roller region, causing said object to be released.

6. The device of claim 4, wherein said releasing means comprises a roller separator operatively connected to at least one of the said rollers and selectively operable to move said rollers sufficiently apart to allow said deformable surface of said object to pass out of said inter-roller region, causing said object to be released.

7. The device of claim 1 where said axes of said first roller and said second roller are substantially parallel to each other.

8. The device of claim 1 further including a biasing means to bias said rollers toward each other with sufficient force to facilitate holding the deformable surface of said object in place when said deformable surface is between said rollers.

9. The device of claim 1 wherein said rollers are forced toward each other by force of a spring.

10. The device of claim 1 wherein said drive means is an electrically powered actuator.

11. The device of claim 1 wherein said drive means is an air-powered actuator.

12. The device of claim 1 wherein said first and second rollers are of cylindrical shape.

13. The device of claim 1 wherein said rollers are covered by rubber.

14. The device of claim 1 wherein said rollers are knurled.

15. The device of claim 1 wherein said object with said deformable surface is a sack that contains an interior object.

16. The device of claim 1, further comprising a controller which controls said device three operational phases: grab, hold, and release.

17. The device of claim 1, further comprising a proximity signal generating element that generates a proximity signal when the device is in close proximity of an object.

18. The device of claim 17, wherein said proximity signal generating element is a proximity switch, which issues said proximity signal when the device is close to the object.

19. The device of claim 17, wherein said proximity signal generating element is an electromechanical switch, which issues said proximity signal when said electromechanical switch contacts the object.

20. The device of claim 17, further comprising:
   a holding signal generating element that generates a holding signal when sufficient portion of said deformable surface of said object is collected between said rollers; and a releasing signal generating element that generates a releasing signal to release said object, wherein said drive means turns said rollers inwardly in response to said proximity signal when said holding signal generating element has not generated any holding signal and said releasing signal generating element has not enerated any releasing signal.

21. The device of claim 1, further comprising a holding signal generating element that generates a holding signal when sufficient portion of said deformable surface of the object is collected between said rollers.

22. The device of claim 21, wherein said holding signal generating element is an electromechanical switch.

23. The device of claim 22, where said deformable surface of the object collected between said rollers causes said electromechanical switch to issue said holding signal.

24. The device of claim 1, further comprising a releasing signal generating element that generates a releasing signal to release said object.

25. The device of claim 24, wherein said releasing signal generating element is a momentary switch pressed by an operator.

26. The device of claim 24, wherein said releasing signal generating element generates a releasing signal to release said object based on a command from a computer.

27. The device of claim 24, wherein a releasing means causes said deformable surface of said object to pass out of said inter-roller region causing said object to be released in response to said releasing signal.

28. The device of claim 24 further comprising a holding signal generating element that generates a holding signal when sufficient portion of said deformable surface of said object is collected between said rollers, wherein if said holding signal generating element generates a holding signal, as long as said releasing signal generating element has not generated any releasing signal, said holding means is engaged.

29. A device mountable on a transport mechanism for contacting, grasping and holding an object having a deformable surface, comprising:

a mounting bracket mountable to said transport mechanism;

a first and a second holding brackets, movable relative to each other and held by said mounting bracket wherein said first holding bracket is fixedly attached to said mounting bracket and said second holding bracket is pivotably attached to said mounting bracket and moves relative to said first holding bracket;

a first roller, rotatable about a first roller axis and rotatably supported on said first holding bracket, said first roller further including a dragging surface for engaging and drawing said deformable surface when contacting said deformable surface of said object;

a second roller, rotatable about a second roller axis and rotatably supported on said second holding bracket, said second roller further including a dragging surface for engaging and drawing said deformable surface when contacting said deformable surface of said object; and a drive means for rotating at least one of the said rollers;

wherein when said first roller turns along a first direction, and said roller surface of said first roller is placed into contact with said deformable surface of said object, said first roller surface draws said deformable surface of said object into an inter-roller region between said first and second rollers, thereby grasping said object.

30. The device of claim 29 further including a biasing means to bias said holding brackets toward each other with sufficient force to facilitate holding the deformable surface of said object in place when said deformable surface is between said rollers.

31. The device of claim 29 wherein said holding brackets are forced toward each other by force of at least one spring.

32. The device of claim 29, further comprising a holding means selectively operable to releaseably engage at least one of the said rollers, and prevent rotation of the roller when engaged, so that when said deformable surface of said object is located in said inter-roller region and said holding means is engaged, the contact between said deformable surface of said object and said first and second rollers causes said object to be held by said device.

33. The device of claim 32 wherein the holding means for preventing the rotation of said rollers is a friction brake.

34. The device of claim 32 wherein the holding means for preventing the rotation of said rollers is a ratchet mechanism.

35. The device of claim 29, further comprising a releasing means operatively connected to at least one of the said rollers and selectively operable to allow said deformable surface of said object to pass out of said inter-roller region causing said object to be released.

36. The device of claim 35, wherein said releasing means comprises said drive means being selectively operable to rotate said first roller in a second direction to draw said deformable surface of the said object out of said inter-roller region, causing said object to be released.

37. The device of claim 35, wherein said releasing means comprises a roller separator operatively connected to at least one of the said rollers and selectively operable to move said rollers sufficiently apart to allow said deformable surface of said object to pass out of said inter-roller region, causing said object to be released.

38. The device of claim 29 where said axes of said first roller and said second roller are substantially parallel to each other.

39. The device of claim 29 further including a biasing means to bias said rollers toward each other with sufficient force to facilitate holding the deformable surface of said object in place when said deformable surface is between said rollers.

40. The device of claim 29 wherein said rollers are forced toward each other by force of a spring.

41. The device of claim 29 wherein said drive means is an electrically powered actuator.

42. The device of claim 29 wherein said drive means is an air-powered actuator.

43. The device of claim 29 wherein said first and second rollers are of cylindrical shape.

44. The device of claim 29 wherein said rollers are covered by rubber.

45. The device of claim 29 wherein said rollers are knurled.

46. The device of claim 29 wherein said object with said deformable surface is a sack that contains an interior object.

47. A method of manipulating an object;

mounting a grapple device to a transport mechanism, wherein said grapple device comprises (i) a supporting bracket assembly (ii) a first roller, having a roller axis, said roller rotatably mounted on said supporting bracket assembly, and said first roller being rotatable about its axis, wherein said first roller further comprises a gripping surface for engaging the graspable portion of the object, (iii) a second roller, having a roller axis, and said second roller being rotatable about its axis, wherein said second roller further comprises a gripping surface for engaging the graspable portion of said object, (iv) a biasing means to bias said rollers toward each other with sufficient force to facilitate holding said graspable portion of said object in place between said rollers, (v) a driving means for rotating said rollers, and (vi) a holding means selectively operable to releaseably engage at least one of said rollers, and prevent rotation of said roller when engaged;

positioning said grapple device close to said object;

activating a grabbing operation of said grapple device, wherein said driving means rotates said first roller in a first direction, such that said first roller and said second roller rotate in opposite directions inwardly, and when said roller surface of said first roller contacts said object, a graspable portion of said object is drawn between said first and the second rollers, thereby grasping said object;

stopping the rotation of said rollers by said holding means when a sufficient portion of said object is grabbed between said rollers, thereby holding said object;

maneuvering said grapple device and object, via said transport mechanism, to a desired location; and releasing said object from said grapple wherein said driving means rotates said first roller in a second direction, said first roller and said second roller turn outwardly in opposing rotations.

* * * * *